United States Patent [19]
Aono et al.

[11] Patent Number: 4,591,244
[45] Date of Patent: May 27, 1986

[54] ZOOM LENS

[75] Inventors: Yasuhiro Aono, Kawasaki; Koichi Matsumoto, Ohyaguchi Kita, both of Japan

[73] Assignee: Nippon Kogaku K. K., Tokyo, Japan

[21] Appl. No.: 500,395

[22] Filed: Jun. 2, 1983

[30] Foreign Application Priority Data

Jun. 7, 1982 [JP] Japan ................... 57-97370
Jun. 7, 1982 [JP] Japan ................... 57-97371

[51] Int. Cl.⁴ .......................................... G02B 15/00
[52] U.S. Cl. .................................. 350/427; 350/430
[58] Field of Search ............................... 350/427, 430

[56] References Cited
U.S. PATENT DOCUMENTS 4,080,047 3/1978 Uesugi et al. ............... 350/427
4,198,126 4/1980 Abe et al. .................... 350/430

Primary Examiner—John K. Corbin
Assistant Examiner—P. M. Dzierzynski
Attorney, Agent, or Firm—Shapiro and Shapiro

[57] ABSTRACT

A zoom lens is composed of, in the order from the object side, a focusing lens unit of a positive refractive power, a variation lens unit of a negative refractive power, a compensator lens unit of a negative refractive power, a front relay lens group of a positive refractive power and a rear relay lens group of a positive refractive power. The rear relay lens group is composed of, in the order from the object side, a negative lens component and a positive lens component. Optimum conditions are employed in the refractive power arrangement of the front and rear relay lens groups and of the negative and positive components of the rear relay lens group, and in the distance between the negative and positive components of the rear relay lens group.

12 Claims, 28 Drawing Figures

FIG. 7A

SPHERICAL ABERRATION
F1.6
-0.3 0 0.3

ASTIGMATISM
y=5.5
---- MERIDIONAL RAYS
—— SAGITTAL RAYS
-0.3 0 0.3

DISTORTION
y=5.5
-5.0 0 5.0(%)

FIG. 7B

SPHERICAL ABERRATION
F1.6
-0.3 0 0.3

ASTIGMATISM
y=5.5
---- MERIDIONAL RAYS
—— SAGITTAL RAYS
-0.3 0 0.3

DISTORTION
y=5.5
-5.0 0 5.0(%)

FIG. 7C

SPHERICAL ABERRATION
F2.0
-0.3 0 0.3

ASTIGMATISM
y=5.5
---- MERIDIONAL RAYS
—— SAGITTAL RAYS
-0.3 0 0.3

DISTORTION
y=5.5
-5.0 0 5.0(%)

FIG. 8A
SPHERICAL ABERRATION  
F1.6  
-0.3 0 0.3
ASTIGMATISM  
y=5.5  
---- MERIDIONAL RAYS  
—— SAGITTAL RAYS  
-0.3 0 0.3
DISTORTION  
y=5.5  
-5.0 0 5.0(%)
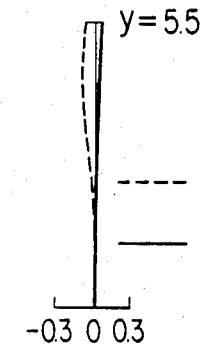
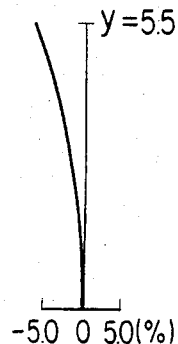
FIG. 8B
SPHERICAL ABERRATION  
F1.6  
-0.3 0 0.3
ASTIGMATISM  
y=5.5  
---- MERIDIONAL RAYS  
—— SAGITTAL RAYS  
-0.3 0 0.3
DISTORTION  
y=5.5  
-5.0 0 5.0(%)
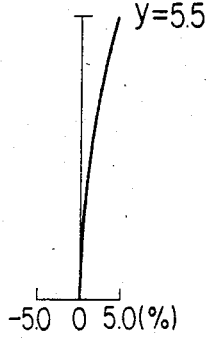
FIG. 8C
SPHERICAL ABERRATION  
F2.2  
-0.3 0 0.3
ASTIGMATISM  
y=5.5  
---- MERIDIONAL RAYS  
—— SAGITTAL RAYS  
-0.3 0 0.3
DISTORTION  
y=5.5  
-5.0 0 5.0(%)
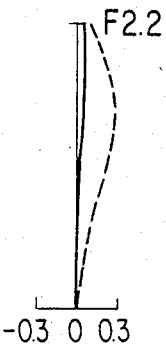
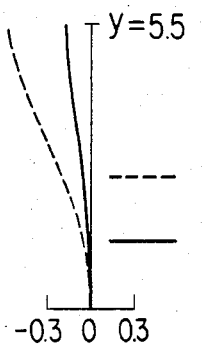
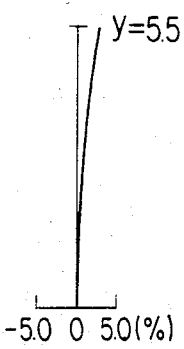

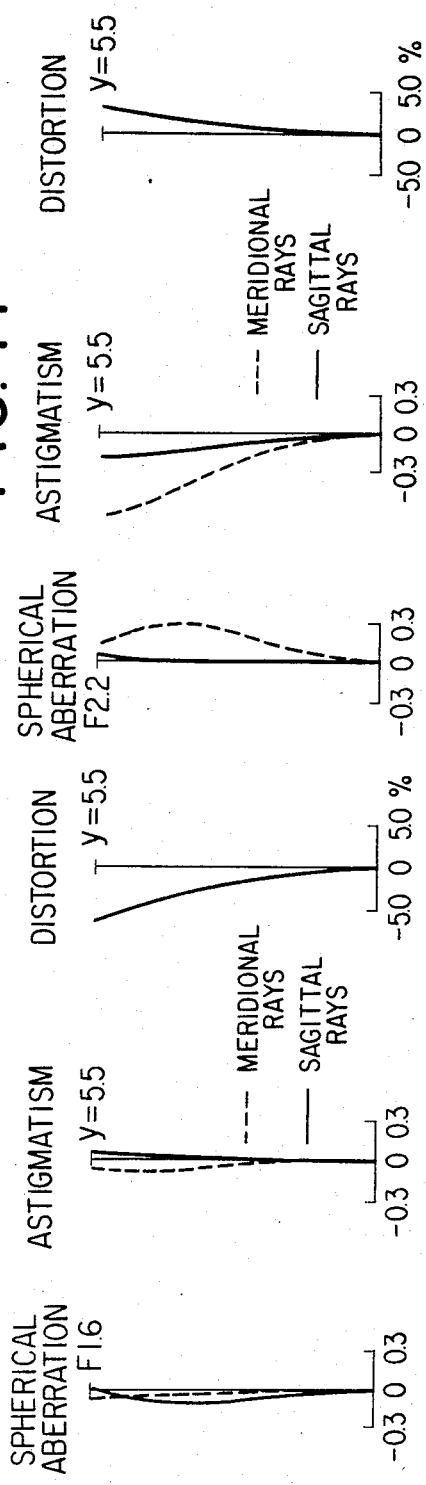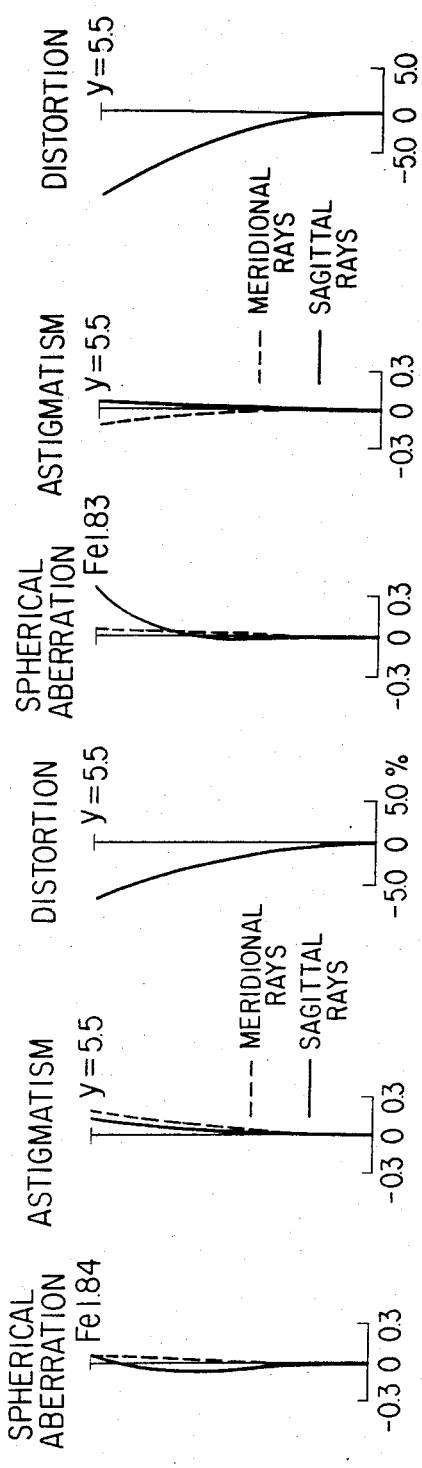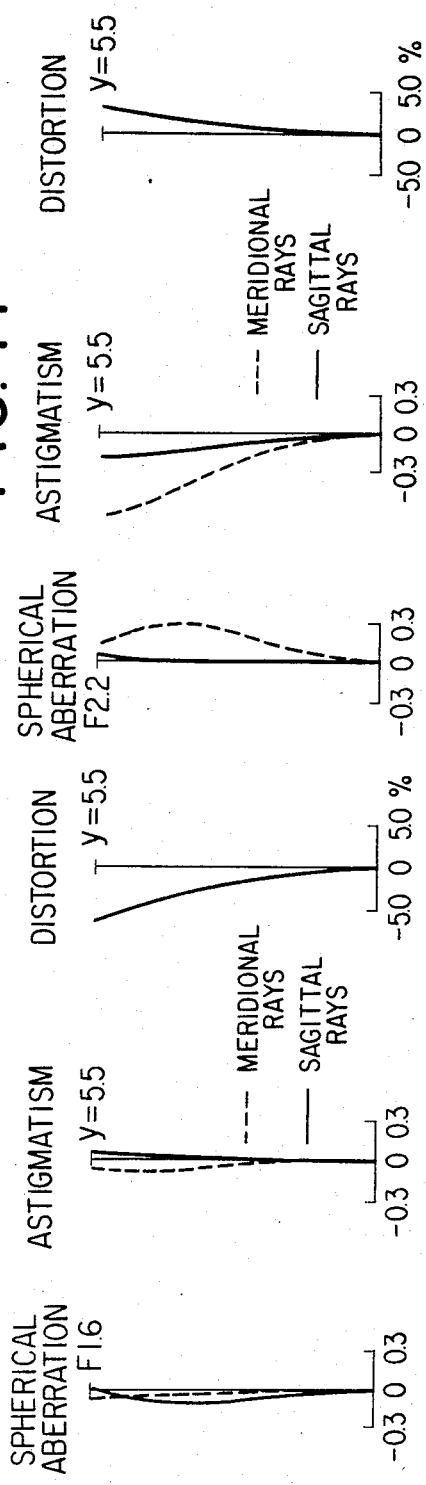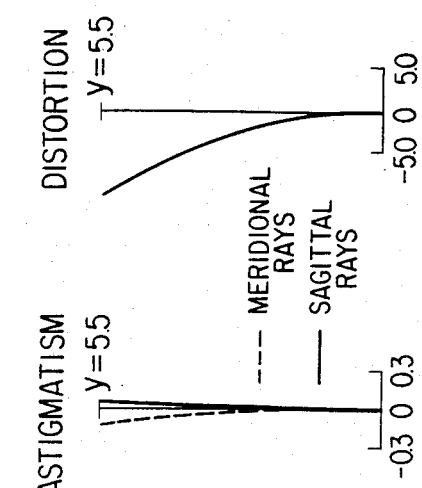

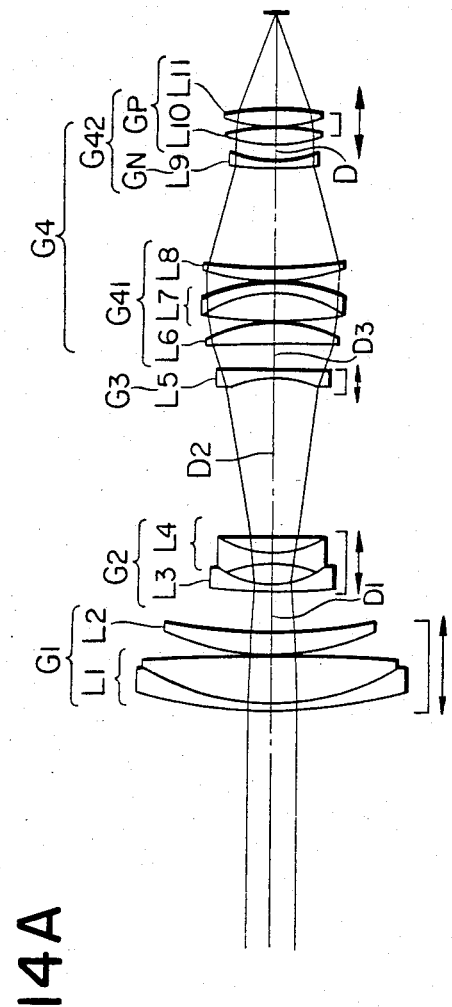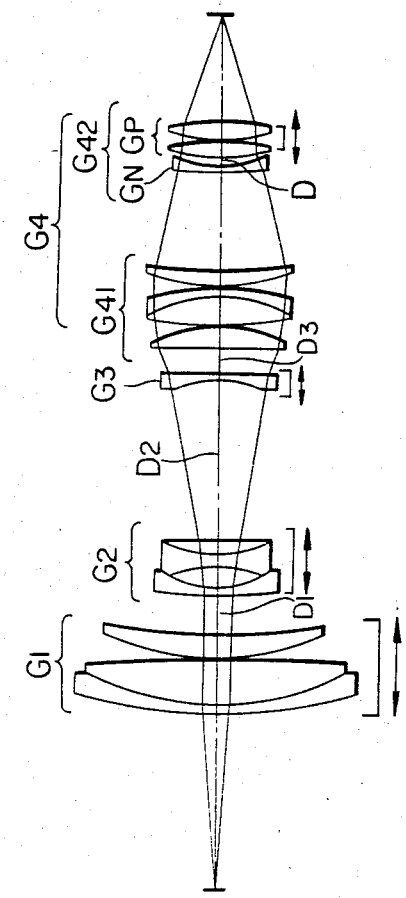
FIG. 14A
FIG. 14B

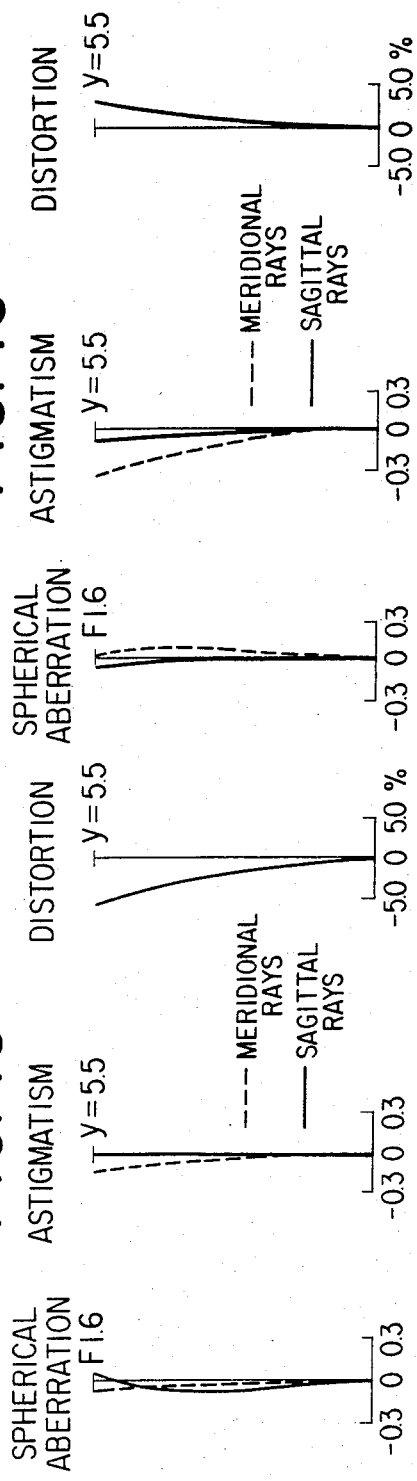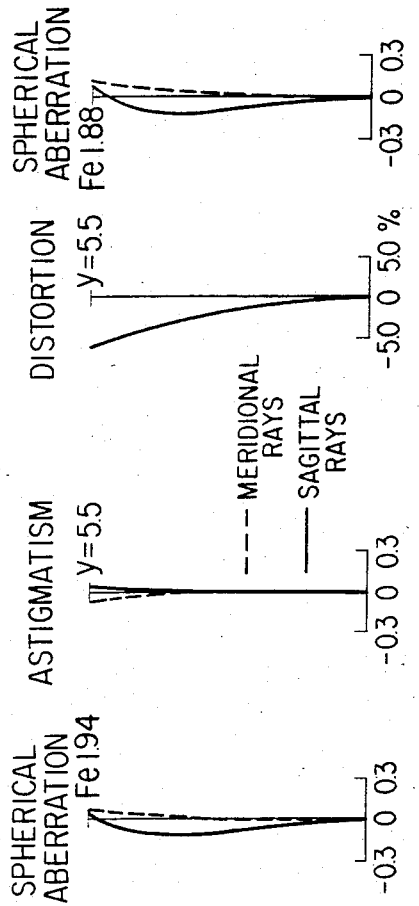

ZOOM LENS

BACKGROUND OF THE INVENTION

1. Field of the Invention

The present invention relates to a zoom lens of a large aperture and a large zoom ratio composed, in the order from the object side, of a focusing lens unit of a positive refractive power, a variator lens unit of a negative refractive power, a compensator lens unit of a negative refractive power and a relay lens unit, and more particularly to such zoom lens for use in combination with a television camera.

2. Description of the Prior Art

The optical system for use in a television camera has generally to be a so-called telecentric optical system in which the exit pupil thereof is positioned at an approximately infinite distance. Also a back focus length of a certain magnitude or more is required in order to enable, for example, the mounting of a rear converter. These conditions impose significant restriction on the condition of power of the relay lens unit, and have been obstacles in reducing the size and improving the performance of the zoom lens of the above-mentioned kind.

Also for the purpose of photographing an object at a very close range shorter than the usual shortest photographing distance, there are already known methods of:

(1) integrally moving the lens units positioned in front of the relay lens unit;

(2) moving the variator lens unit and/or the compensator lens unit; and (3) moving a front group of the relay lens unit. The method (1) is disclosed for example in the Japanese Patents Laid-open No. Sho51-32635 and Sho50-63919, while the method (2) is disclosed for example in the Japanese Patent Publication No. Sho50-23814 and in the Japanese Patents Laid-open Nos. Sho51-2439 and Sho49-53852. These two methods cannot provide satisfactory imaging performance in the very close range photography because of significant variation in the aberrations caused by the relative movement of the variator unit with respect to the relay lens unit. Also in the above-mentioned methods (1) and (2), the position of the entrance pupil varies in the very close range photography since the diaphragm is usually positioned in the relay lens unit or immediately in front thereof. In the very close range photography at the wide angle side, the entrance pupil moves toward the image plane side so that the position of the principal ray corresponding to the maximum image height at the frontmost lens moves away from the optical axis, thus requiring larger lenses in the front units in order to secure enough light in the peripheral area of the image plane. Also the method (1) becomes inevitably complicated in structure, since a separate mechanism is required for integrally moving the focusing lens unit incorporating a focusing mechanism and another lens unit incorporating a zooming mechanism. Such structural complication can be avoided in the method (2) by the use of a groove for moving the lens units at the very close range photography as the extention of a cam groove for zooming, but the photographing at very close range is limited to the wide-angle end or the telescopic end of the zooming range. The very close range photography over the entire zooming range can only be made with a complicated mechanism as in the method (1), and the entire lens system becomes inevitably large since a moving space for such very close range photography has to be provided although it is unnecessary for ordinary zooming operation.

Also a zoom lens for a color television camera requires an exit pupil positioned sufficiently far from the image plane, and the refractive power of the front group of the relay lens unit becomes far larger than that of the rear group if the refractive power arrangement in the relay lens unit is determined to satisfy the above-mentioned condition. Also the variator lens unit and the compensator lens unit positioned in front of the relay lens unit are divergent systems in most cases, so that the diameter of the front group of the relay lens unit is larger than that of the rear group. In the very close range photography with such zoom lens and with the method (3), satisfactory imaging performance cannot be expected due to a significant variation in the aberrations, since a lens unit of a high refractive power, involving strongly diverging and converging light beams, has to be displaced. Also such method, involving the movement of a large lens unit, is disadvantageous in terms of the mechanical precision. A zoom lens capable of photographing at a very close range according to the method (3) is described in the Japanese Patent Publication No. Sho48-32387, but the example is disclosed only in a limited zoom ratio of 2.5 for a zoom lens for an 8-mm movie camera with an f-number 1.8.

SUMMARY OF THE INVENTION

An object of the present invention is to provide a compact, light-weight zoom lens of improved performance having the exit pupil at an approximately infinite distance and still provided with a back-focus length enough for mounting a rear converter.

Another object of the present invention is to provide a zoom lens capable of providing satisfactory imaging performance in the very close range photography as well as in the ordinary photography, and enabling such very close range photographing over the entire zooming range.

The foregoing objects can be achieved according to the present invention by a zoom lens composed, in the order from the object side, of a focusing lens unit of a positive refractive power, a variator lens unit of a negative refractive power, a compensator lens unit of a negative refractive power, a front relay lens group of a positive refractive power and a rear relay lens group of a positive refractive power, wherein said rear relay lens group is composed, in the order from the object side, of a negative lens component and a positive lens component, and wherein optimum conditions are employed in the refractive power arrangement of the front and rear relay lens groups and of the negative lens component of said rear relay lens group, and in the distance between said negative and positive components of the rear relay lens group.

Besides, the zoom lens of the present invention can be focused from the infinite distance to a determined short distance by the movement of the focusing lens unit, and can further be focused to an object of a very close range by the movement of a positive lens component in the rear relay lens group in the axial direction with respect to the lens system positioned in front.

BRIEF DESCRIPTION OF THE DRAWINGS

FIGS. 5A, 5B, 5C to 8A, 8B, 8C are aberration charts of said first to fourth embodiments;

FIG. 10 is aberration charts of the fifth embodiment focused to the infinite distance at the wide-angle end of the zooming range;

FIG. 11 is aberration charts of the fifth embodiment focused to the infinite distance at the telescopic end of the zooming range;

FIG. 12 is aberration charts of the fifth embodiment focused to the very close range, achieved by the movement of the positive lens component of the rear relay lens group, at the wide-angle end of the zooming range;

FIG. 13 is aberration charts of the fifth embodiment focused to the very close range, achieved by the movement of the front relay lens group, at the wide-angle end of the zooming range;

FIG. 14A shows a lens structure of a sixth embodiment focused to the infinite distance at the wide-angle end of the zooming range;

FIG. 14B shows the lens structure of the sixth embodiment focused to the very close range at the wide-angle end of the zooming range;

FIG. 15 is aberration charts of the sixth embodiment focused to the infinite distance at the wide-angle end of the zooming range;

FIG. 16 is aberration charts of the sixth embodiment focused to the infinite distance at the telescopic end of the zooming range;

FIG. 17 is aberration charts of the sixth embodiment focused to the very close range, achieved by the movement of the positive lens component of the rear relay lens group, at the wide-angle end of the zooming range; and FIG. 18 is aberration charts of the sixth embodiment focused to the very close range by the movement of the front relay lens group, at the wide-angle end of the zooming range.

DESCRIPTION OF THE PREFERRED EMBODIMENTS

Figure 1:
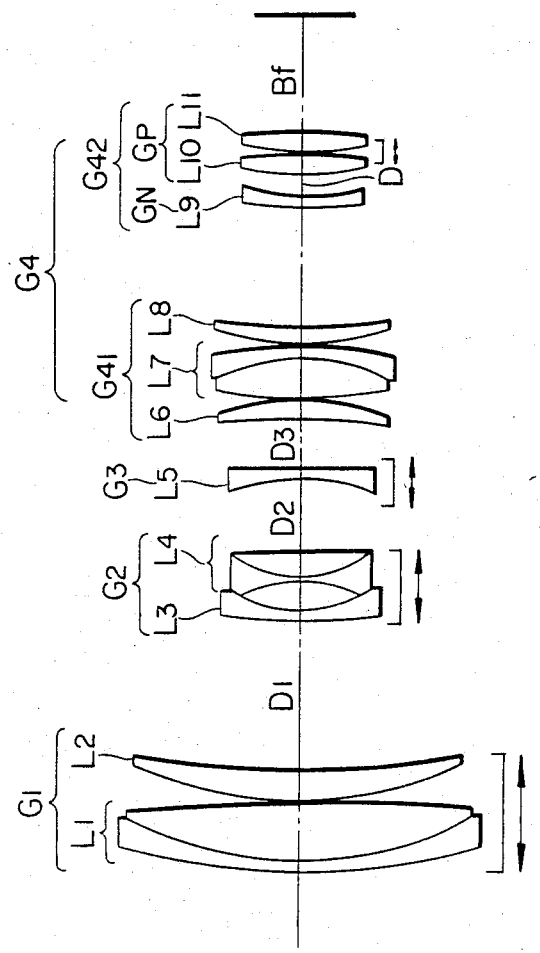
FIGS. 1 to 4 illustrate lens structures in first to fourth embodiments of the present invention at an intermediate focal length.

The zoom lens of the present invention is featured by a combination, as shown in FIG. 1, in the order from the object side, of a focusing lens unit G1 of a positive refractive power, a variator lens unit G2 of a negative refractive power, a compensator lens unit G3 of a negative refractive power, and a relay lens unit G4 having a front group G41 and a rear group G42, wherein said rear relay lens group G42 is composed, in the order from the object side, of a negative lens component $G_N$ and a positive lens component $G_p$, and wherein the focal lengths $f_{41}$, $f_{42}$ and $f_N$ respectively of the front relay lens group G41, rear relay lens group G42 and negative lens component $G_N$ of said rear relay lens group, and the distance D between said negative lens component $G_N$ and positive lens component $G_P$ are so selected as to satisfy the following relations:

$$0.3 < |f_{41}/f_{42}| < 0.5 \tag{1}$$

$$0.25 < |f_N/f_{42}| < 0.9 \tag{2}$$

$$0.05 < |D/f_{42}| < 0.17 \tag{3}$$

The above-mentioned relations employed in the present invention will be explained in detail in the following.

The relation (1) defines the arrangement of refractive powers of the front and rear relay lens groups G41, G42, and is essential for obtaining a telecentric optical system in which the exit pupil is positioned at an approximately infinite distance. At a value below the lower limit the exit pupil excessively approaches the image plane from infinity at the image side, while at a value above the upper limit the exit pupil excessively approaches the image plane from the object side, so that the telecentric optical system cannot be obtained in either case. Such telecentric optical system is required only in the color video camera, particularly in the single-tube color video camera, since the color stripe filter used on the image taking tube results in a color shading phenomenon if the optical system is not telecentric.

The relations (2) and (3) are required for obtaining a back-focus length long enough for mounting a rear converter without excessively extending the entire length, while maintaining satisfactory imaging performance. According to the present invention, an adequate back-focus length for mounting a rear converter is obtained, without excessively extending the entire length, by separating the rear relay lens group G42 into a lens component $G_N$ of a negative focal length and another lens component $G_P$ of a positive focal length arranged in this order from the object side, and by positioning the principal point of said rear relay lens group G42 at the image side thereof.

A refractive power of the negative lens component $G_N$ in the rear relay lens group G42 below the lower limit of the relation (2) results in an unnecessarily long back-focus length and a negatively deteriorated Petzval's sum, and involves an excessive burden for compensating aberrations in said negative lens component $G_N$. For this reason spherical aberration and coma of the higher order in this lens group become unavoidable, and a satisfactory imaging performance can no longer be expected. On the other hand, a weaker refractive power of said negative lens component above the upper limit of the relation (2) shortens the back-focus length and results in a situation in which the axial ray and the off-axial ray entering the positive lens component $G_P$ of the rear relay lens group have no significant difference in the incident position and in the incident angle. It therefore becomes difficult to suitably balance the spherical aberration of the axial ray and the coma of the off-axial ray in said positive lens component $G_P$ of the rear relay lens group, and thus to achieve satisfactory imaging performance.

Also a smaller distance D between the negative lens component $G_N$ and the positive lens component $G_P$ of the rear relay lens group G42 below the lower limit of the relation (3) renders it difficult to obtain a back-focus length long enough for mounting the rear converter, and provides only small differences in the incident position and in the incident angle between the axial ray and the off-axial ray, insufficient for balancing the spherical aberration and coma. On the other hand, a distance above the upper limit of the relation (3) provides an unnecessarily long back-focus length and deteriorates the Petzval's sum in the negative direction. Consequently, it becomes difficult to maintain satisfactory imaging performance.

In addition to the foregoing, according to the present invention, the entire lens groups positioned in front of the positive lens component $G_P$ in the rear relay lens group G42 are so selected as to constitute an afocal system, and said positive lens component $G_P$ can be moved axially closer to the lens system in front to enable photographing at the very close range over the entire zooming range. Since the rays between the negative lens component $G_N$ and the positive lens component $G_P$ of the rear relay lens group G42 are approximately parallel, the movement of the positive lens component $G_P$ causes little variation in the spherical aberration. Also since the range of said movement is limited, the changes in the astigmatism, distortion and in the position of exit pupil are negligibly small. Besides the very close range photography is possible over the entire zooming range, from the wide-angle end to the telescopic end, and the photographing distance can be regulated by the zooming operation. It is therefore rendered possible to use so-called quick focus shifting technique, for example in case of photographing persons at different distances from the camera, by focusing the lens to a distant person with the focusing lens unit G1, focusing the lens to a nearby person with the positive lens component $G_P$ in the rear relay lens group and instantaneously changing the focus state through a quick movement of said positive lens component $G_P$.

The above-described basic structure for the very close range photography requires the following relations to be satisfied:

$$0.5 < f_{42}/f_T < 0.75 \quad (4)$$

$$0.16 < D/f_P < 0.4 \quad (5)$$

$$0.7 < f_P/B < 1.3 \quad (6)$$

wherein $f_T$ stands for the focal length of the entire lens system at the telescopic end of the zooming range, $f_{42}$ is the focal length of the rear relay lens group G42, D is the distance between the faces of the negative lens component $G_N$ and the positive lens component $G_P$ in said rear relay lens group G42, $f_P$ is the focal length of said positive lens component, and B is the distance from the rear principal point of said positive lens component to the image plane.

The relation (4) represents a requirement, specific to the color video camera, of maintaining the exit pupil sufficiently far from the image plane, and a ratio outside the limit values will provide an exit pupil excessively close to the image plane, thus giving rise to the color shading phenomenon. Also it will become difficult to divide the rear relay lens component G42 into the negative lens component $G_N$ and the positive lens component $G_P$ with an appropriate refractive power relationship, if said ratio is below the lower limit.

The relation (5) represents a condition for securing a space for moving the positive lens component $G_P$ of the rear relay lens group G42. A ratio below the lower limit renders it impossible to achieve a satisfactorily short distance for the very close range photography and to sufficiently increase the image magnification, while a value above the upper limit results in an unnecessarily long back-focus length, leading to an extended length of the entire lens system. Also in such case the diameter of the positive lens component has to be increased since the position of the off-axial ray on said positive lens component moves away from the optical axis.

The relation (6) represents a condition for maintaining the entire lens system positioned in front of the positive lens component $G_P$ of the rear relay lens group G42 at a nearly afocal state. Said front lens system becomes strongly divergent or convergent respectively when the ratio in the relation (6) becomes lower than the lower limit or higher than the upper limit, thus leading to strong variations in the spherical aberration, coma aberration and curvature of image plane. It therefore becomes difficult to maintain satisfactory imaging performance both in the normal photographing mode and in the very close range photographing mode.

In practice, the lens component $G_N$ of negative focal length in the rear relay lens group G42 can be composed of a single negative lens satisfying the following relation:

$$-2.0 < (r_b + r_a)/(r_b - r_a) < -0.9 \quad (7)$$

wherein $r_a$ and $r_b$ respectively represent radii of curvature at the object side and at the image side, and the lens component $G_P$ of positive focal length is preferably composed of two positive single lenses, or of a positive single lens and a positive adhered lens. In the relay lens unit according to the present invention, light beams are convergent and almost parallel respectively at the object side and at the image side of the negative lens component $G_N$ in the rear relay lens group G42. Consequently, in case said negative lens component $G_N$ is composed of a single negative lens, the amounts of compensation of aberrations have to be balanced at a face of said negative lens at the object side and at the other face at the image side, in order to achieve satisfactory imaging performance. In the relation (7), a value below the lower limit increases the amount of correction of aberrations at the face of said negative lens at the object side, thus leading to deteriorated imaging performance due to inevitable high-order aberrations. On the other hand, a value above the upper limit increases the amount of correction required at the other face at the image side and causes a displacement of the principal point of the negative lens toward the image side. It therefore becomes impossible to achieve the object of obtaining a sufficient back-focus length for mounting the rear converter without excessively extending the entire length of the lens.

The front relay lens group G41 is composed of three or four positive lenses, of which one is an adhered positive lens composed of a positive lens and a negative lens satisfying the following relations:

$$\nu_P - \nu_N > 25.0 \quad (8)$$

$$n_N - n_P > 0.18 \quad (9)$$

where $\nu_P$ and $\nu_N$ are Abbe's numbers respectively of said positive and negative lenses, and $n_P$ and $n_N$ are refractive indexes thereof to the d-line ($\lambda = 587.6$ nm), and the refractive index $n_{SN}$ to said d-line, of the negative lens constituting the negative lens component in the rear relay lens group G42 should preferably satisfy the following relation:

$$n_{SN} > 1.65 \quad (10)$$

The relation (8) represents a condition for satisfactorily suppressing the chromatic aberration, particularly on the optical axis, while the relation (9) represents a condition for correcting the Petzval's sum. The zoom lens of the present invention tends to show an increase in the Petzval's sum in the negative direction because of stricter power requirements in the variator lens unit if the entire lens is made smaller, but the use of such adhered lenses with different refractive indexes in the front relay lens group allows one to correct the Petzval's sum in the positive direction.

In case the negative lens component in the rear relay lens group is composed of a single negative lens, a higher refractive index is preferable as it enables the use of a larger radius of curvature in said negative lens, thus avoiding high-order aberrations. The relation (10) represents such requirement.

Now the present invention will be further clarified by embodiments thereof, which are all designed with back-focus lengths in excess of ca. 20 mm, in order to enable the use of a rear converter.

A first embodiment shown in FIG. 1 is an 8-times zoom lens with the focal length ranging from 11.5 mm to 92 mm and with F-number 1.6. The front relay lens group G41 is composed of three positive lenses L6, L7, L8, and the positive lens component $G_P$ in the rear relay lens group G42 is composed of two positive single lenses L10, L11.

Figure 2:
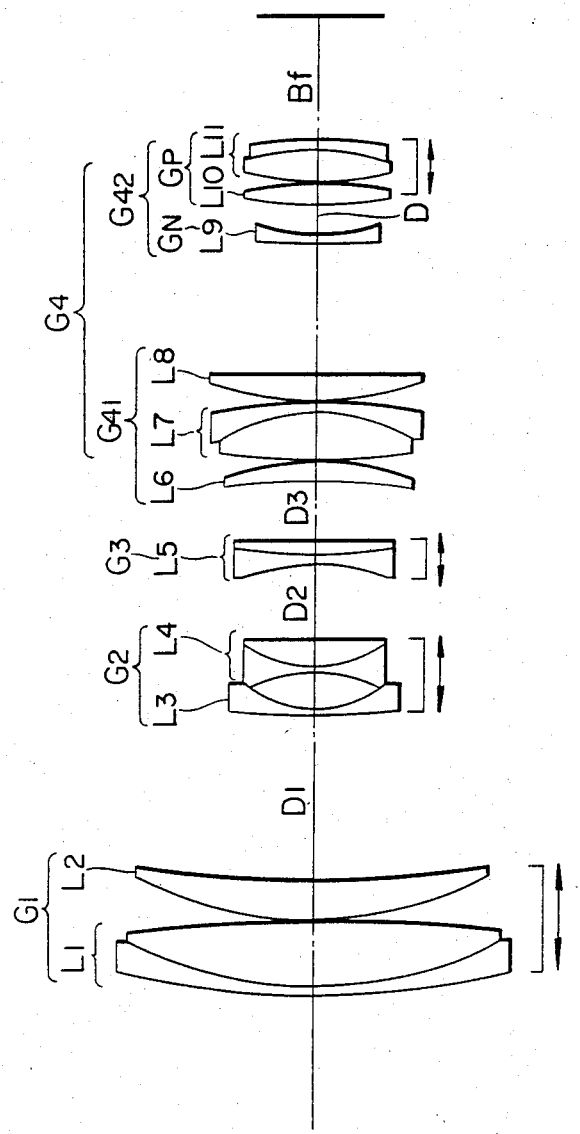

A second embodiment shown in FIG. 2 is a 10-times zoom lens with the focal length ranging from 10.5 to 105 mm and with F-number 1.6 to 1.8. It is different from the first embodiment in that the positive lens component $G_P$ in the rear relay lens group G42 is composed of a positive single lens L10 and a positive adhered lens L11. The compensator lens unit G3 is composed of an adhered lens in order to satisfactorily suppress the chromatic aberration on the optical axis over the entire zooming range, since the zooming range is wider than in the first embodiment.

Figure 3:
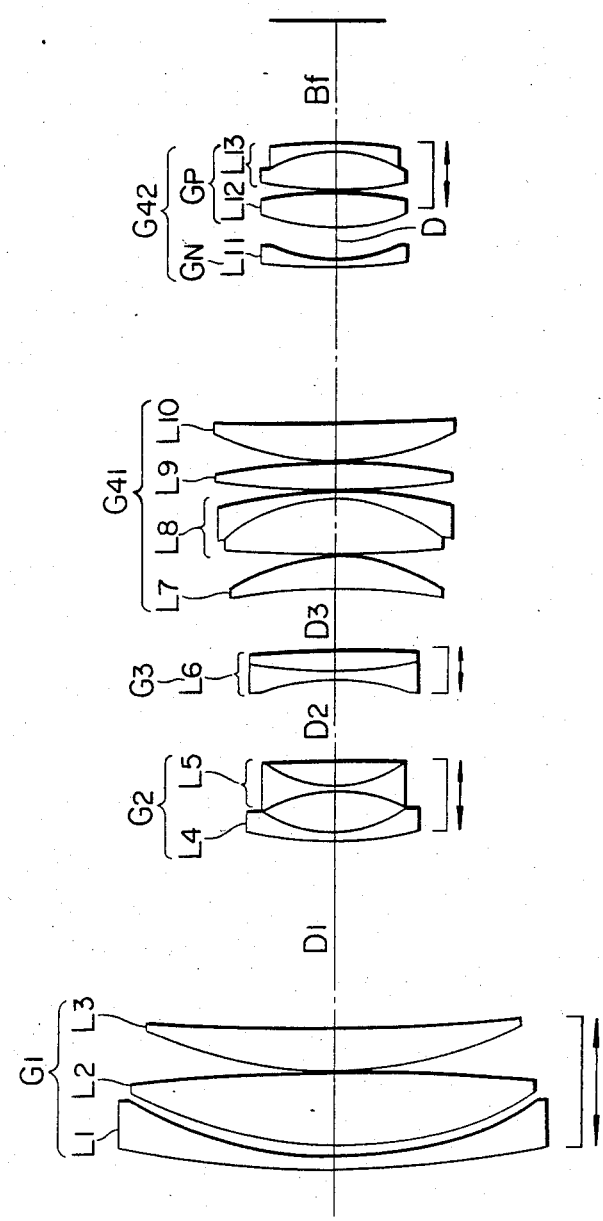

A third embodiment shown in FIG. 3 is a 13-times zoom lens with the focal length ranging from 9.5 to 123.5 mm and with F-number 1.6 to 2.0. The front relay lens group G41 is composed of four positive lenses L7, L8, L9 and L10, and the focusing lens unit G1 is composed of three single lenses L1, L2, L3, respectively negative, positive and positive, in order to satisfactorily reduce the spherical aberration at the telescopic end of the zooming range.

Figure 4:
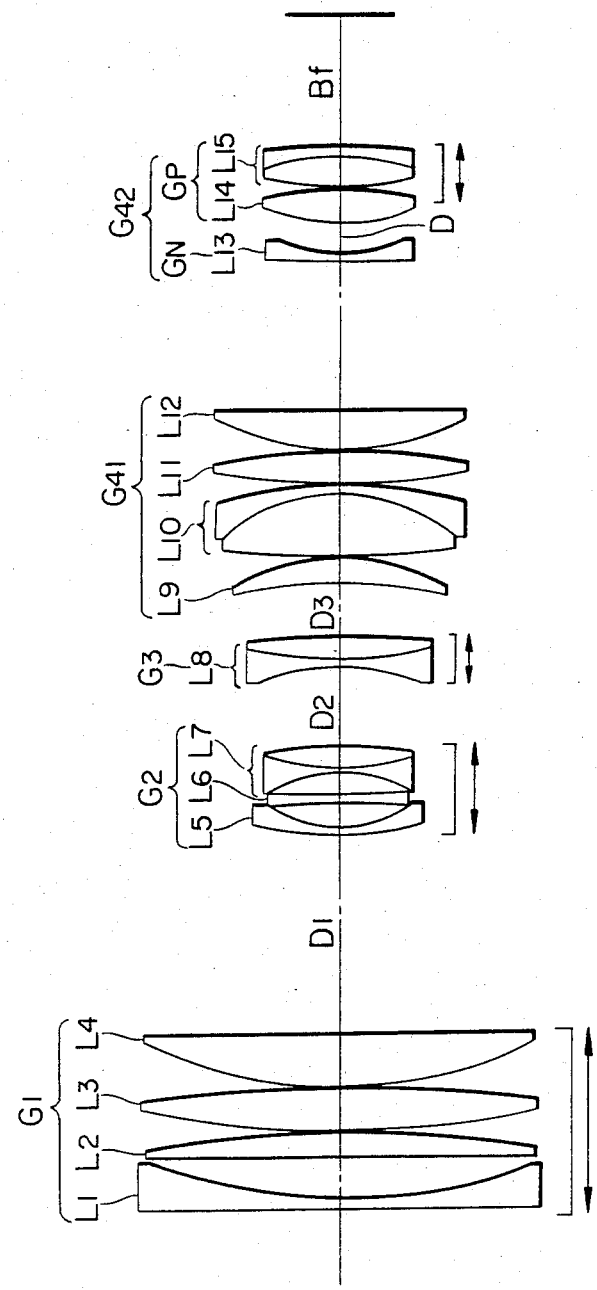
Figure 5A:
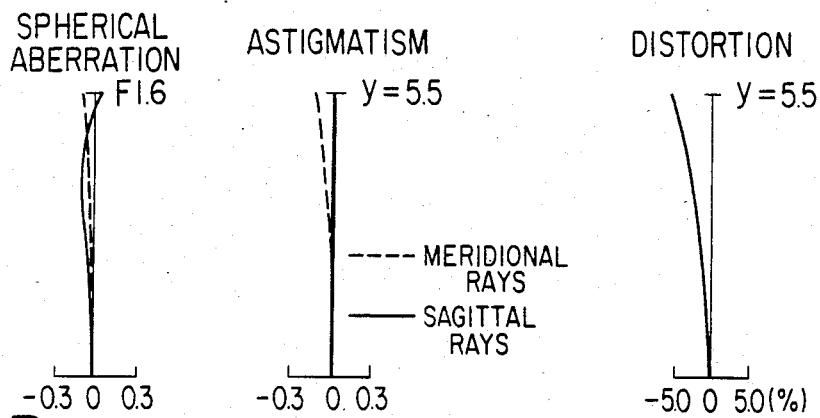
Figure 5B:
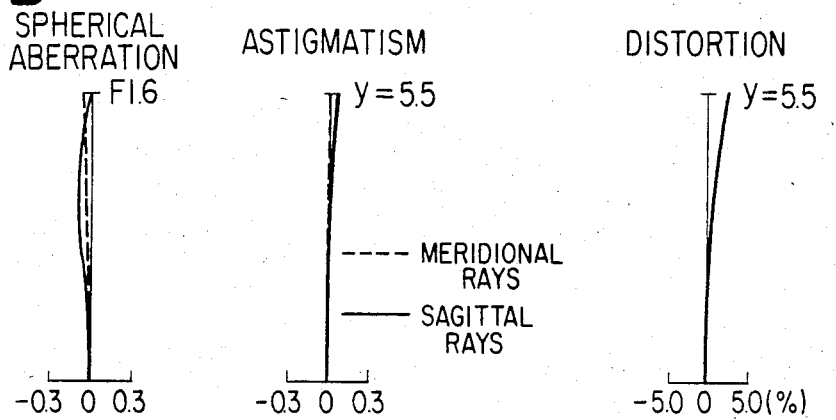
Figure 5C:
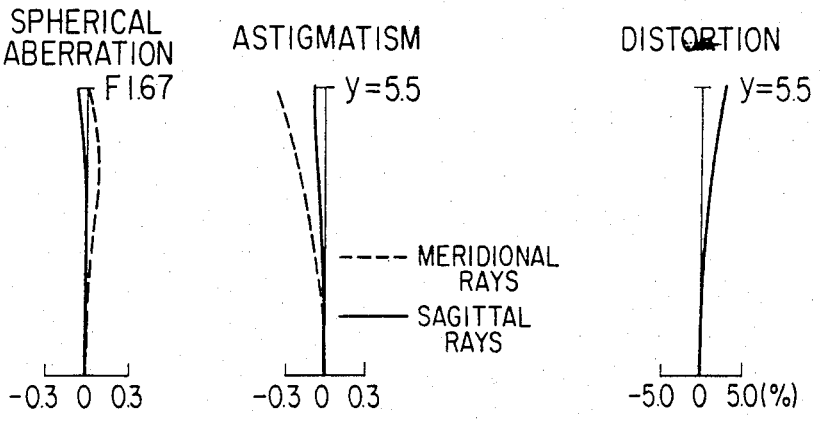
Figure 6A:
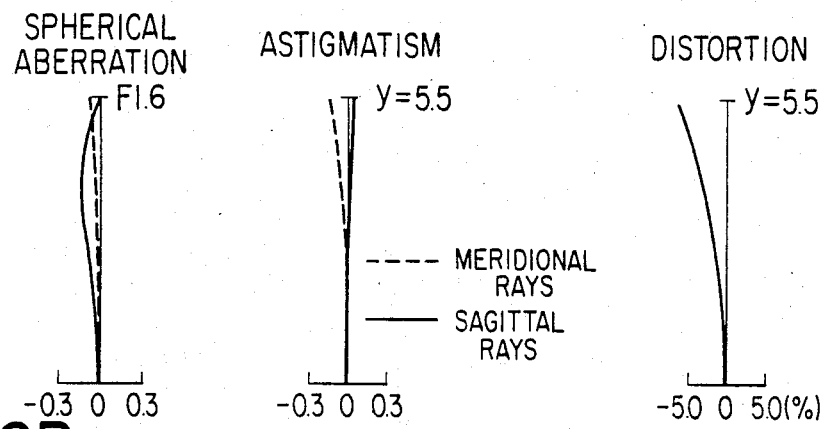
Figure 6B:
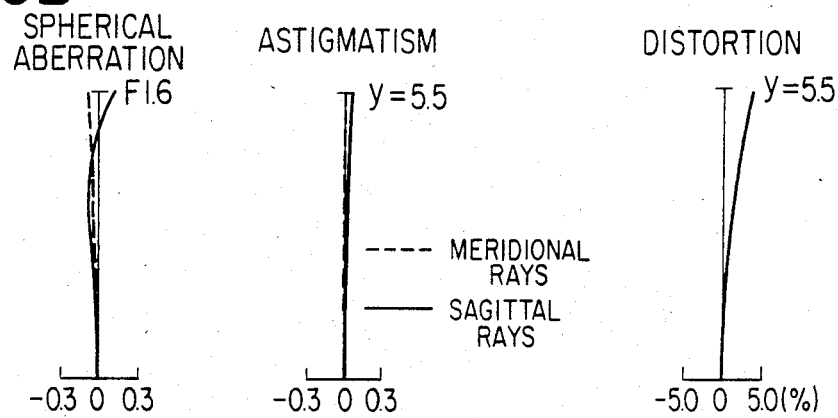
Figure 6C:
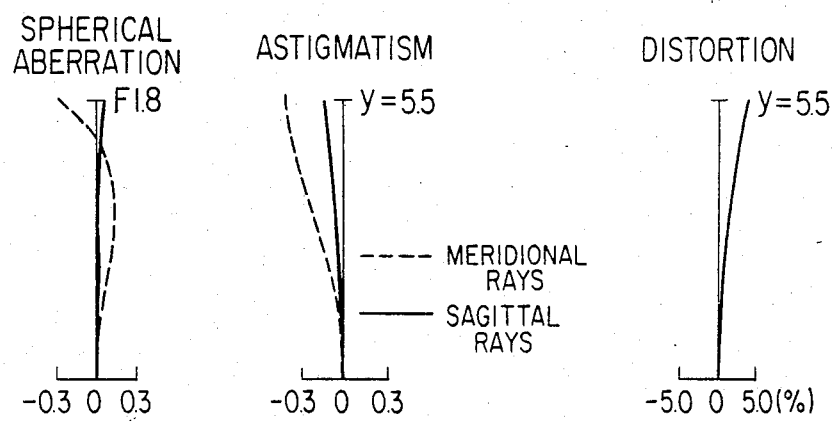

A fourth embodiment shown in FIG. 4 is a 13-times zoom lens with focal length ranging from 9.5 to 123.5 mm and with F-number 1.6 to 2.2. The relay lens unit G4 is similar to that in the third embodiment, but the structure of the focusing lens unit G1 and of the variator lens unit G2 is made significantly different from that in the first to third embodiments, in order to allow the use of small front lenses. More specifically, the focusing lens unit G1 is composed of a negative lens L1 at the object side, followed by three positive lenses L2, L3, L4, while the variator lens unit G2 is composed of a negative meniscus lens L5 with the convex face thereof directed toward the object side, a negative lens L6, and a negative adhered lens L7 with the convex face thereof directed toward the image side.

The numerical data of the foregoing embodiments are shown in Tabs. 1 to 4, wherein the numbers shown in the left-hand column indicate the sequential order from the object side.

TABLE 1

(First Embodiment)

Focal length: f = 11.5–92  Zoom ratio: 8
F-number: 1.6  Back focus length: Bf = 20.3

| No. | Radius of curvature (r) | Axial thickness and distance of lens (d) | Refractive index (n) | Abbe's number | | | | |
|---|---|---|---|---|---|---|---|---|
| (1) | 87.48300 | 1.30000 | 1.80499 | 25.32 | $L_1$ | | | |
| (2) | 47.00000 | 10.30000 | 1.65102 | 58.55 | | $G_1$ | | |
| (3) | −401.88400 | 0.10000 | | | | | | |
| (4) | 49.60000 | 5.40000 | 1.51754 | 64.13 | $L_2$ | | | |
| (5) | 128.86745 | $D_1$ (variable) | | | | | | |
| (6) | 89.82700 | 1.00000 | 1.71341 | 53.92 | $L_3$ | | | |
| (7) | 15.40000 | 5.81978 | | | | | | |
| (8) | −20.40000 | 1.00000 | 1.58920 | 61.18 | | $G_2$ | | |
| | | | | | $L_4$ | | | |
| (9) | 18.00000 | 3.90000 | 1.71736 | 29.48 | | | | |
| (10) | −295.34900 | $D_2$ (variable) | | | | | | |
| (11) | −23.85400 | 1.00000 | 1.60427 | 60.55 | $L_5-G_3$ | | | |
| (12) | −221.41758 | $D_3$ (variable) | | | | | | |
| (13) | −156.35500 | 3.80000 | 1.71300 | 53.97 | $L_6$ | | | |
| (14) | −28.38800 | 0.10000 | | | | | | |
| (15) | 76.10100 | 7.30000 | 1.56384 | 60.82 | $L_7$ | | | |
| (16) | −22.37000 | 1.00000 | 1.75692 | 31.70 | | $G_{41}$ | | |
| (17) | −70.43700 | 0.10000 | | | | | | |
| (18) | 30.52700 | 3.30000 | 1.71300 | 53.97 | $L_8$ | | | $G_4$ |
| (19) | 91.61450 | 20.45445 | | | | | | |
| (20) | 80.91300 | 1.20000 | 1.80518 | 25.36 | $L_9-G_{2N}$ | | | |
| (21) | 18.37800 | D = 4.20000 | | | | | | |
| (22) | 29.72800 | 3.50000 | 1.51454 | 54.62 | $L_{10}$ | | $G_{42}$ | |
| (23) | −98.09700 | 0.10000 | | | | $G_{2P}$ | | |
| (24) | 30.18400 | 3.50000 | 1.51835 | 60.34 | $L_{11}$ | | | |
| (25) | −87.09650 | | | | | | | |

| f | 11.74 | 32.37 | 89.24 |
|---|---|---|---|
| $D_1$ | 0.88454 | 25.76287 | 39.84595 |
| $D_2$ | 41.96794 | 13.26234 | 3.25263 |
| $D_3$ | 4.95355 | 8.78083 | 4.70745 |

$f_{41} = 22.64$
$f_{42} = 52.61$
$\dfrac{f_{41}}{f_{42}} = 0.43$
$\dfrac{D}{f_{42}} = 0.080$ TABLE 1-continued (First Embodiment)

$f_N = -29.79$  $\quad \dfrac{f_N}{f_{42}} = 0.57 \quad \dfrac{r_b + r_a}{r_b - r_a} = -1.59$
$f_P = 22.75$

TABLE 2

(Second Embodiment)

Focal length: f = 10.5-105  Zoom ratio: 10
F-number: 1.6-1.8  Back focus length: Bf = 20.9

| No. | Radius of curvature (r) | Axial thickness and distance of lens (d) | Refractive index (n) | Abbe's number | | | |
|---|---|---|---|---|---|---|---|
| (1) | 114.03554 | 1.40000 | 1.80518 | 25.36 | } $L_1$ | } $G_1$ | |
| (2) | 54.14096 | 11.00000 | 1.60311 | 60.68 | | | |
| (3) | −279.33036 | 0.10000 | | | | | |
| (4) | 50.64850 | 6.90000 | 1.60311 | 60.68 | $L_2$ | | |
| (5) | 168.39185 | $D_1$ (variable) | | | | | |
| (6) | 111.32572 | 1.00000 | 1.71300 | 53.97 | } $L_3$ | } $G_2$ | |
| (7) | 15.65706 | 6.30000 | | | | | |
| (8) | −20.70523 | 1.00000 | 1.60311 | 60.68 | } $L_4$ | | |
| (9) | 18.05059 | 4.60000 | 1.72825 | 28.34 | | | |
| (10) | 3166.44580 | $D_2$ (variable) | | | | | |
| (11) | −28.21079 | 1.00000 | 1.71300 | 53.97 | } $L_5$-$G_3$ | | |
| (12) | 40.95354 | 3.00000 | 1.75520 | 27.64 | | | |
| (13) | −364.36194 | $D_3$ (variable) | | | | | |
| (14) | −131.84266 | 3.80000 | 1.67790 | 55.61 | $L_6$ | } $G_{41}$ | } $G_4$ |
| (15) | −30.60149 | 0.10000 | | | | | |
| (16) | 89.01062 | 8.60000 | 1.56384 | 60.82 | } $L_7$ | | |
| (17) | −21.83033 | 1.00000 | 1.75520 | 27.64 | | | |
| (18) | −89.13951 | 0.10000 | | | | | |
| (19) | 37.50940 | 5.00000 | 1.67790 | 55.61 | $L_8$ | | |
| (20) | −545.69064 | 22.29852 | | | | | |
| (21) | 961.83658 | 1.00000 | 1.75692 | 31.70 | $L_9$ $G_{2N}$ | | |
| (22) | 27.18038 | D = 4.99746 | | | | | |
| (23) | 42.60442 | 3.60000 | 1.51454 | 54.62 | $L_{10}$ | } $G_{2P}$ | $G_{42}$ |
| (24) | −55.52480 | 0.10000 | | | | | |
| (25) | 31.98664 | 6.20000 | 1.50137 | 56.46 | } $L_{11}$ | | |
| (26) | −21.49719 | 1.00000 | 1.79668 | 45.52 | | | |
| (27) | −53.01002 | | | | | | |

| f | 10.71 | 33.03 | 101.85 |
|---|---|---|---|
| $D_1$ | 1.00224 | 28.21081 | 42.47571 |
| $D_2$ | 44.86062 | 12.83591 | 3.38776 |
| $D_3$ | 4.83770 | 9.65383 | 4.83709 |

$f_{41} = 25.03$  $\quad \dfrac{f_{41}}{f_{42}} = 0.43 \quad \dfrac{D}{f_{42}} = 0.086$
$f_{42} = 58.03$
$f_N = -36.97$  $\quad \dfrac{f_N}{f_{42}} = 0.64 \quad \dfrac{r_b + r_a}{r_b - r_a} = -1.06$
$f_P = 26.94$

TABLE 3

(Third Embodiment)

Focal length: f = 9.5-123.5  Zoom ratio: 13
F-number: 1.6-2.0  Back focus length: Bf = 21.0

| No. | Radius of curvature (r) | Axial thickness and distance of lens (d) | Refractive index (n) | Abbe's number | | |
|---|---|---|---|---|---|---|
| (1) | 164.47510 | 2.40000 | 1.80518 | 25.36 | $L_1$ | } $G_1$ |
| (2) | 57.57483 | 1.50000 | | | | |
| (3) | 59.81973 | 12.50000 | 1.62280 | 57.03 | $L_2$ | |
| (4) | −269.28461 | 0.20000 | | | | |
| (5) | 59.54058 | 7.00000 | 1.71300 | 53.97 | $L_3$ | |
| (6) | 270.98471 | $D_1$ (variable) | | | | |
| (7) | 56.62441 | 1.00000 | 1.79668 | 45.52 | $L_4$ | } $G_2$ |
| (8) | 16.34713 | 7.10000 | | | | |
| (9) | −20.96462 | 1.00000 | 1.69350 | 53.76 | } $L_5$ | |
| (10) | 18.03228 | 4.20000 | 1.80518 | 25.36 | | |
| (11) | 639.47905 | $D_2$ (variable) | | | | |
| (12) | −26.54970 | 1.00000 | 1.79668 | 45.52 | } $L_6$-$G_3$ | |
| (13) | 54.33568 | 3.30000 | 1.80518 | 25.36 | | |

TABLE 3-continued (Third Embodiment)

| No. | r | d | n | ν | Lens | Group | |
|---|---|---|---|---|---|---|---|
| (14) | −166.16348 | $D_3$ (variable) | | | | | |
| (15) | −105.37465 | 6.00000 | 1.50137 | 56.46 | $L_7$ | | |
| (16) | −24.83766 | 0.20000 | | | | | |
| (17) | 226.03534 | 9.50000 | 1.49782 | 82.28 | $L_8$ | | |
| (18) | −22.78339 | 1.00000 | 1.75692 | 31.70 | | $G_{41}$ | |
| (19) | −70.94479 | 0.20000 | | | | | |
| (20) | 107.58399 | 4.50000 | 1.50137 | 56.46 | $L_9$ | | |
| (21) | −107.58399 | 0.20000 | | | | | $G_4$ |
| (22) | 34.69279 | 6.50000 | 1.50137 | 56.46 | $L_{10}$ | | |
| (23) | 340.16833 | 26.74563 | | | | | |
| (24) | 124.33392 | 1.00000 | 1.79631 | 40.92 | $L_{11}$–$G_{2N}$ | | |
| (25) | 19.23885 | D = 5.00000 | | | | | |
| (26) | 20.78059 | 6.50000 | 1.51680 | 64.12 | $L_{12}$ | | |
| (27) | −33.91813 | 0.20000 | | | | $G_{42}$ | |
| (28) | 59.95957 | 6.50000 | 1.50137 | 56.46 | $L_{13}$ | $G_{2P}$ | |
| (29) | −16.59106 | 1.00000 | 1.79631 | 40.92 | | | |
| (30) | −83.63835 | | | | | | |

| f | 9.70 | 34.26 | 121.01 |
|---|---|---|---|
| $D_1$ | 0.99038 | 32.62359 | 48.04898 |
| $D_2$ | 50.92201 | 14.34962 | 3.86358 |
| $D_3$ | 5.27426 | 10.21343 | 5.27409 |

$f_{41} = 27.53$   $\dfrac{f_{41}}{f_{42}} = 0.37$   $\dfrac{D}{f_{42}} = 0.067$ $f_{42} = 74.64$ $f_N = -28.70$   $\dfrac{f_N}{f_{42}} = 0.38$   $\dfrac{r_b + r_a}{r_b - r_a} = -1.37$ $f_P = 24.98$

TABLE 4

(Fourth Embodiment)

Focal length: f = 9.5–123.5  Zoom ratio: 13
F-number: 1.6–2.2  Back focus length: Bf = 22.9

| No. | Radius of curvature (r) | Axial thickness and distance of lens (d) | Refractive index (n) | Abbe's number | Lens | Group | |
|---|---|---|---|---|---|---|---|
| (1) | 1502.13023 | 2.30000 | 1.80518 | 25.36 | $L_1$ | | |
| (2) | 90.78012 | 5.80000 | | | | | |
| (3) | 1926.73228 | 4.30000 | 1.49782 | 82.28 | $L_2$ | $G_1$ | |
| (4) | −183.73229 | 0.20000 | | | | | |
| (5) | 109.90946 | 7.60000 | 1.60311 | 60.68 | $L_3$ | | |
| (6) | −255.50723 | 0.20000 | | | | | |
| (7) | 58.97339 | 9.00000 | 1.60311 | 60.68 | $L_4$ | | |
| (8) | 888.25417 | $D_1$ (variable) | | | | | |
| (9) | 52.54722 | 1.00000 | 1.77279 | 49.44 | $L_5$ | | |
| (10) | 16.69305 | 4.40000 | | | | | |
| (11) | −94.40983 | 1.30000 | 1.77279 | 49.44 | $L_6$ | $G_2$ | |
| (12) | 270.28738 | 3.30000 | | | | | |
| (13) | −18.84218 | 1.00000 | 1.71300 | 53.97 | $L_7$ | | |
| (14) | 29.89061 | 3.70000 | 1.80518 | 25.36 | | | |
| (15) | −54.55838 | $D_2$ (variable) | | | | | |
| (16) | −27.12786 | 1.00000 | 1.77279 | 49.44 | $L_8$ | | $G_3$ |
| (17) | 48.81202 | 3.50000 | 1.78470 | 26.07 | | | |
| (18) | −182.34763 | $D_3$ (variable) | | | | | |
| (19) | −84.05917 | 4.40000 | 1.51680 | 64.12 | $L_9$ | | |
| (20) | −28.13976 | 0.20000 | | | | | |
| (21) | 191.32051 | 11.00000 | 1.49782 | 82.28 | $L_{10}$ | $G_{41}$ | |
| (22) | −23.89707 | 1.00000 | 1.74950 | 35.19 | | | |
| (23) | −60.76258 | 0.20000 | | | | | |
| (24) | 94.96796 | 5.50000 | 1.48749 | 70.24 | $L_{11}$ | | |
| (25) | −80.33178 | 0.20000 | | | | | $G_4$ |
| (26) | 36.35731 | 6.50000 | 1.48749 | 70.24 | $L_{12}$ | | |
| (27) | 647.60464 | 25.45640 | | | | | |
| (28) | −4355.69598 | 1.20000 | 1.75692 | 31.70 | $L_{13}$–$G_{2N}$ | | |
| (29) | 20.13725 | D = 5.01602 | | | | | |
| (30) | 23.41871 | 6.00000 | 1.50137 | 56.46 | $L_{14}$ | $G_{42}$ | |
| (31) | −39.05657 | 0.20000 | | | | | |
| (32) | 44.06630 | 5.80000 | 1.50137 | 56.46 | $L_{15}$ | $G_{2P}$ | |
| (33) | −20.99092 | 1.00000 | 1.79631 | 40.98 | | | |
| (34) | −92.42991 | | | | | | |

| f | 9.5 | 34 | 123.5 |
|---|---|---|---|
| $D_1$ | 0.77634 | 34.38666 | 50.62356 |
| $D_2$ | 52.58988 | 13.78311 | 2.74391 |
| $D_3$ | 4.01614 | 9.21258 | 4.01488 |

TABLE 4-continued
(Fourth Embodiment)

$f_{41} = 27.21$  $\dfrac{f_{41}}{f_{42}} = 0.31$  $\dfrac{D}{f_{42}} = 0.057$ $f_{42} = 88.31$ $f_N = -26.48$  $\dfrac{f_N}{f_{42}} = 0.30$  $\dfrac{r_b + r_a}{r_b - r_a} = -0.99$ $f_P = 25.45$ FIGS. 5A, 5B, 5C to 8A, 8B, 8C are aberration charts respectively of the foregoing first to fourth embodiments, wherein in each chart A, B and C respectively represent the states at the shortest, medium and longest focal length. In the charts of spherical aberration, the amounts of deviation from the sine condition are indicated by broken lines. These charts represent aberrations after correction in consideration of various parallel-face plates to be positioned between the lens and the image-taking face, such as the stripe filter, face plate and low-pass filter. It will be understood from these charts that the aberrations are satisfactorily corrected in of the embodiments.

In the foregoing embodiments the very close range photographing mode is possible by the movement of the positive lens component $G_P$ in the rear relay lens group toward the object side as explained before, independently from the focusing by the focusing lens unit G1. In the following there will be explained preferred embodiments capable of such very close range photography, which naturally maintain the structure of the present invention.

Figures 9A, 9B:
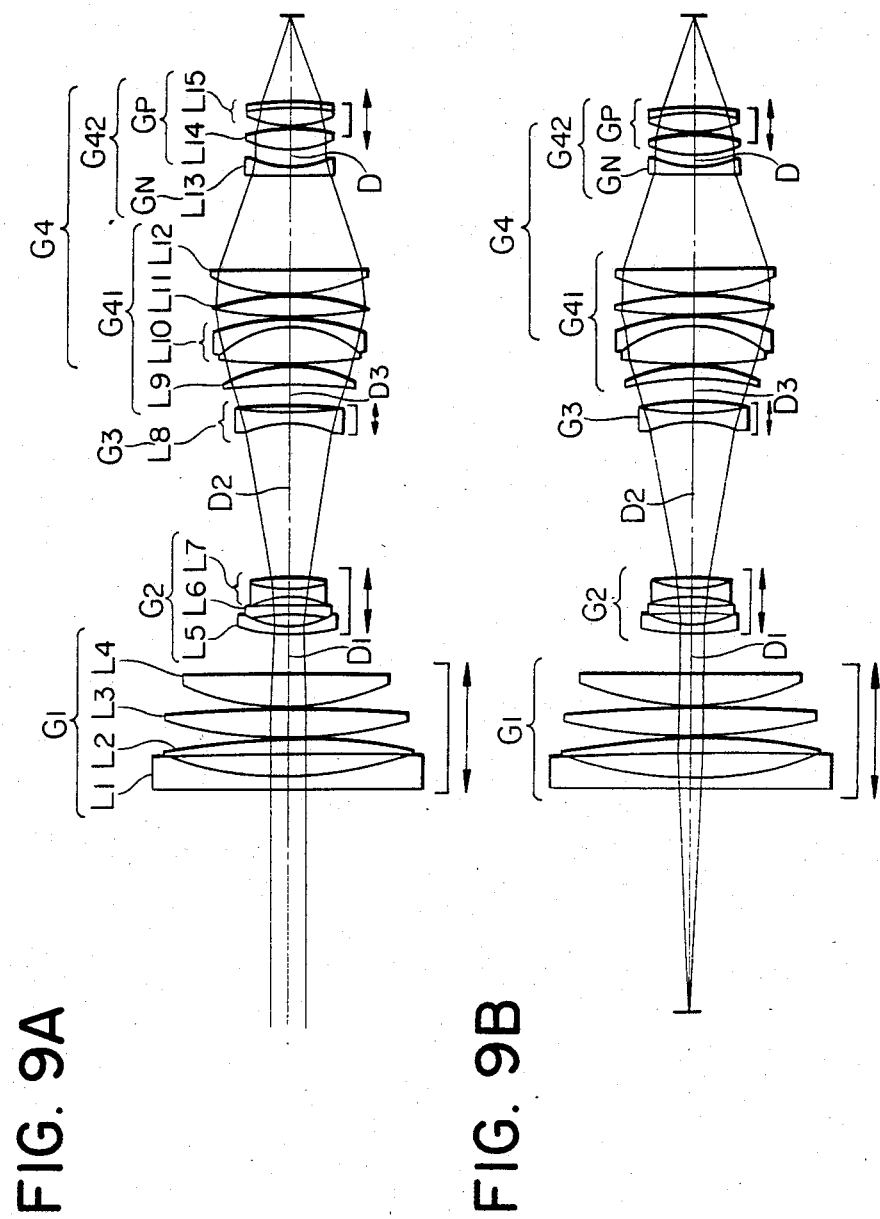
FIG. 9A shows a lens structure of a fifth embodiment focused to the infinite distance at the wide-angle end of the zooming range.
FIG. 9B shows the lens structure of said fifth embodiment focused to a very close range at the wide-angle end of the zooming range.

FIG. 9A shows the lens structure of a fifth embodiment focused to an infinite distance at the wide-angle end of the zooming range, and FIG. 9B shows the lens structure in the very close range photographing mode at said wide-angle end. In these figures there are shown rays from axial objects in focus, and the numerical data of said fifth embodiment are shown in Tab. 5. The following table shows the distance S from the first surface of the lens to the object and the image magnification β respectively at the wide-angle end (f=9.65 mm), an intermediate position (f=34.5 mm) and the telescopic end (f=123.5 mm), corresponding to a movement of 1.5 mm of the positive lens component $G_P$ in the rear relay lens group

|  | S | \|β\| |
|---|---|---|
| Wide-angle end | 25.2 mm | 0.149 |
| Intermediate position | 683.6 mm | 0.042 |
| Telescopic end | 1011.6 mm | 0.012 |

FIGS. 10 and 11 are aberration charts when the lens is focused to infinity respectively at the wide-angle end and at the telescopic end of the zooming range, and FIG. 12 is an aberration chart in the very close range photographing mode of the present invention at the wide-angle end.

TABLE 5
(Fifth Embodiment)

Focal length: f = 9.65–123.5  Zoom ratio: 12.8
F-number: 1.6–2.2  Back focus length: Bf = 22.93

| No. | Radius of curvature (r) | Axial thickness and distance of lens (d) | Refractive index (n) | Abbe's number | | | |
|---|---|---|---|---|---|---|---|
| (1) | 1502.13023 | 2.30000 | 1.80518 | 25.36 | $L_1$ | | |
| (2) | 90.78012 | 5.80000 | | | | | |
| (3) | 1926.73228 | 4.30000 | 1.49782 | 82.28 | $L_2$ | | |
| (4) | −183.73229 | 0.20000 | | | | $G_1$ | |
| (5) | 109.90946 | 7.60000 | 1.60311 | 60.68 | $L_3$ | | |
| (6) | −255.50723 | 0.20000 | | | | | |
| (7) | 58.97339 | 9.00000 | 1.60311 | 60.68 | $L_4$ | | |
| (8) | 888.25394 | $D_1$ (variable) | | | | | |
| (9) | 52.54722 | 1.00000 | 1.77279 | 49.44 | $L_5$ | | |
| (10) | 16.69305 | 4.40000 | | | | | |
| (11) | −94.40983 | 1.30000 | 1.77279 | 49.44 | $L_6$ | | |
| (12) | 270.28738 | 3.30000 | | | | $G_2$ | |
| (13) | −18.84218 | 1.00000 | 1.71300 | 53.97 | } $L_7$ | | |
| (14) | 29.89061 | 3.70000 | 1.80518 | 25.36 | | | |
| (15) | −54.55838 | $D_2$ (variable) | | | | | |
| (16) | −27.12786 | 1.00000 | 1.77279 | 49.44 | } $L_8$ | $G_3$ | |
| (17) | 48.81202 | 3.50000 | 1.78470 | 26.07 | | | |
| (18) | −182.34762 | $D_3$ (variable) | | | | | |
| (19) | −84.05917 | 4.40000 | 1.51680 | 64.12 | $L_9$ | | |
| (20) | −28.13976 | 0.20000 | | | | | |
| (21) | 191.32051 | 11.00000 | 1.49782 | 82.28 | } $L_{10}$ | | |
| (22) | −23.89707 | 1.00000 | 1.74950 | 35.19 | | $G_{41}$ | |
| (23) | −60.76258 | 0.20000 | | | | | |
| (24) | 94.96796 | 5.50000 | 1.48749 | 70.24 | $L_{11}$ | | |
| (25) | −80.33178 | 0.20000 | | | | | $G_4$ |
| (26) | 36.35731 | 6.50000 | 1.48749 | 70.24 | $L_{12}$ | | |
| (27) | 647.60422 | D = 25.45640 | | | | | |
| (28) | −4355.69598 | 1.20000 | 1.75692 | 31.70 | $L_{13}$ | $G_N$ | |
| (29) | 20.13725 | 5.01602 | | | | | $G_{42}$ |
| (30) | 23.41871 | 6.00000 | 1.50137 | 56.46 | $L_{14}$ | | |
| (31) | −39.05657 | 0.20000 | | | | $G_P$ | |
| (32) | 44.06630 | 5.80000 | 1.50137 | 56.46 | | | |

TABLE 5-continued (Fifth Embodiment)

| | | | | | |
|---|---|---|---|---|---|
| (33) | −20.99092 | 1.00000 | 1.79631 | 40.92 | } L$_{15}$ |
| (34) | −92.42991 | | | | |
| f | 9.65 | 123.5 | | | |
| D$_1$ | 0.77634 | 50.62356 | | | |
| D$_2$ | 52.58988 | 2.74391 | | | |
| D$_3$ | 4.01614 | 4.01488 | | | |
| f$_{42}$/f$_T$ = 0.715 | | | | | |
| D/f$_p$ = 0.197 | | | | | |
| f$_p$/B = 0.848 | | | | | |

For the purpose of comparison data are shown in the following in case the very close range photographing mode is achieved in the fifth embodiment by the movement of the front relay lens group G41 toward the image side. In case said front relay lens group G41 is displaced by 1.5 mm, the distance S to the object and the magnification $\beta$ at different zooming positions are as follows:

| | S | $|\beta|$ |
|---|---|---|
| Wide-angle end | 23.6 | 0.141 |
| Intermediate position | 663.3 | 0.039 |
| Telescopic end | 10116.3 | 0.011 |

FIG. 13 is an aberration chart in the very close range photographing mode in the above-mentioned method. Also the sine condition is shown by a broken line in the chart for the spherical aberration. This chart indicates the aberrations after correction in consideration of various parallel-face plates to be placed between the lens and the image-taking face, such as the stripe filter, face plate and low-pass filter, and same corrections are taken into consideration also in the following embodiment. As will be understood from the foregoing tables and charts, both methods provide comparable distances to the object and image magnifications by a same lens movement, but the present invention is advantageous in significantly smaller variation in the aberrations, particularly in the spherical aberration and image distortion.

Tab. 6 shows the numerical data of a sixth embodiment, and FIG. 14A shows the lens structure of said sixth embodiment focused to infinity at the wide-angle end of the zooming range. Also FIG. 14B shows the lens structure at the very close range photographing mode at the wide-angle end of the zooming range. The following table shows the distance S from the first face of the lens to the object and the image magnification $\beta$ in the very close range photographing mode, at the wide angle end (f=11.74 mm), an intermediate position (f=32.4 mm) and the telescopic end (f=89.2 mm) of the zooming range, corresponding to a movement of 2.5 mm of the positive lens component of the rear relay lens group toward the object side.

| | S | $|\beta|$ |
|---|---|---|
| Wide-angle end | 18.8 | 0.212 |
| Intermediate position | 290.7 | 0.078 |
| Telescopic end | 2976.0 | 0.028 |

FIGS. 15 and 16 are aberration charts when the lens is focused to infinity respectively at the wide-angle end and the telescopic end of the zooming range, and FIG. 17 is an aberration chart in the very close range photographing mode of the present invention at the wide-angle end of the zooming range.

TABLE 6

(Sixth Embodiment)

Focal length: f = 11.74–89.24  Zoom ratio: 7.6
F-number: 1.6  Back focus length: Bf = 20.32

| No. | Radius of curvature (r) | Axial thickness and distance of lens (d) | Refractive index (n) | Abbe's number | | | |
|---|---|---|---|---|---|---|---|
| (1) | 87.48300 | 1.30000 | 1.80518 | 25.36 | } L$_1$ | } G$_1$ | |
| (2) | 47.00000 | 10.30000 | 1.65160 | 58.54 | | | |
| (3) | −401.88400 | 0.10000 | | | | | |
| (4) | 49.60000 | 5.40000 | 1.51680 | 64.12 | L$_2$ | | |
| (5) | 128.78410 | D$_1$ (variable) | | | | | |
| (6) | 89.82700 | 1.00000 | 1.71300 | 53.97 | L$_3$ | } G$_2$ | |
| (7) | 15.40000 | 5.81978 | | | | | |
| (8) | −20.40000 | 1.00000 | 1.58913 | 61.18 | } L$_4$ | | |
| (9) | 18.00000 | 3.90000 | 1.71736 | 29.48 | | | |
| (10) | −298.22686 | D$_2$ (variable) | | | | | |
| (11) | −23.85400 | 1.00000 | 1.60311 | 60.68 | L$_5$ | G$_3$ | |
| (12) | −224.93405 | D$_3$ (variable) | | | | | |
| (13) | −156.35500 | 3.80000 | 1.71300 | 53.97 | L$_6$ | | |
| (14) | −28.38800 | 0.10000 | | | | | |
| (15) | 76.10100 | 7.30000 | 1.56384 | 60.82 | } L$_7$ | G$_{41}$ | } G$_4$ |
| (16) | −22.37000 | 1.00000 | 1.75692 | 31.70 | | | |
| (17) | −70.43700 | 0.10000 | | | | | |
| (18) | 30.52700 | 3.30000 | 1.71300 | 53.97 | L$_8$ | | |
| (19) | 91.61446 | 20.45445 | | | | | |
| (20) | 80.91300 | 1.20000 | 1.80518 | 25.36 | L$_9$ | G$_N$ | |
| (21) | 18.37800 | D = 4.20000 | | | | | |

TABLE 6-continued (Sixth Embodiment)

| | | | | | | | |
|---|---|---|---|---|---|---|---|
| (22) | 29.72800 | 3.50000 | 1.51454 | 54.62 | $L_{10}$ | | $G_{42}$ |
| (23) | −98.09700 | 0.10000 | | | | $G_P$ | |
| (24) | 30.18400 | 3.5000 | 1.51835 | 60.34 | $L_{11}$ | | |
| (25) | −87.09650 | | | | | | |
| f | 11.74 | 89.24 | | | | | |
| $D_1$ | 0.87605 | 39.83746 | | | | | |
| $D_2$ | 41.97115 | 3.25583 | | | | | |
| $D_3$ | 4.95439 | 4.70829 | | | | | |
| $f_{42}/f_T = 0.590$ | | | | | | | |
| $D/f_P = 0.185$ | | | | | | | |
| $f_P/B = 0.976$ | | | | | | | |

For the purpose of comparison there are shown the distance S to the object and the image magnification $\beta$ in the following in the very close range photographing mode achieved by a movement of 3.2 mm of the front relay lens group G41 toward the image side:

| | S | $|\beta|$ |
|---|---|---|
| Wide-angle end | 19.5 | 0.177 |
| Intermediate position | 295.8 | 0.065 |
| Telescopic end | 3015.9 | 0.023 |

As will be understood from the foregoing data, the method of the present invention provides a same distance to the object and a larger image magnification with a smaller lens movement.

FIG. 18 is an aberration chart in the very close range photographing mode achieved by the movement of the front relay lens group G41. Comparison of FIGS. 17 and 18 clearly indicates that the present invention provides significantly smaller variations in the aberration, particularly in the curvature of image plane and in the image distortion.

In general the very close range photography requires front lenses of large diameters, since the position of the principal ray corresponding to the maximum image height moves away from the optical axis at the frontmost lens face as the absolute value of the image magnification increases. The foregoing embodiment allows one to use sufficiently small front lenses since the distance to the object in the very close range photographing mode is sufficiently small and the image magnification is large.

As explained in the foregoing, the present invention allows one to provide a compact zoom lens of a large aperture and a high zooming ratio, provided with a sufficient back-focus length for mounting a rear converter. Particularly the relay lens structure of the present invention can be adapted to various variation lens system as shown in the foregoing embodiments, and can provide various excellent zoom lenses adapted for use in the television cameras. Besides the present invention provides a zoom lens of a large aperture and a high zoom ratio capable of photographing at a very close range with a simple operation and over the entire zooming range and still maintaining satisfactory imaging performance both in the normal photographing mode and in the very close range photographing mode, wherein the rear relay lens group is divided into a negative lens component and a positive lens component, and wherein the entire lens system positioned in front of said positive lens component constitutes an approximately afocal optical system while said positive lens component is moved by a small distance to achieve such very close range photographing mode.

We claim:

1. A telecentric compact zoom lens with a long back-focus length comprising, in the order from the object side:

a focusing lens unit of a positive refractive power;
   a variator lens unit of a negative refractive power;
   a compensator lens unit of a negative refractive power; and
   a relay lens unit comprising a front lens group of a positive refractive power and a rear lens group of a positive refractive power including a negative lens component and a positive lens component positioned behind said negative lens component with a predetermined distance therefrom, light beams at the object side of said negative lens component being convergent and light beams at the image side of said negative lens component being approximately parallel,
   wherein said zoom lens satisfies the following relations:

$$0.3 < |f_{41}/f_{42}| < 0.5$$

$$0.25 < |f_N/f_{42}| < 0.9$$

$$0.05 < |D/f_{42}| < 0.17$$

$$-2.0 < (r_b + r_a)/(r_b - r_a) < -0.9$$

where $f_{41}$ and $f_{42}$ respectively stand for the focal lengths of the front and rear lens group of said relay lens unit, $f_N$ stands for the focal length of the negative lens component of the rear lens group, D stands for the distance between said negative and positive lens components, and $r_a$ and $r_b$ respectively stand for radii of curvature at the object side and at the image side of the negative lens componet in said rear relay lens group.

2. A zoom lens according to claim 1, wherein said front relay lens group comprises at least three positive lens components, of which at least one is composed of mutually cemented positive and negative lenses, satisfying the following relations:

$$\nu_P - \nu_N > 25.0$$

$$n_N - n_P > 0.18$$

wherein $\nu_P$ and $\nu_N$ are Abbe's numbers respectively of said mutually cemented positive and negative lenses, and $n_P$ and $n_N$ are refractive indexes thereof to the d-line ($\lambda = 587.6$ nm).

3. A zoom lens according to claim 2, satisfying the following relation:

$n_{SN} > 1.65$ wherein $n_{SN}$ stands for the refractive index to the d line of the negative lens component in said rear relay lens group.

4. A zoom lens according to claim 3 comprising the following parameters:

| | Focal length: f = 11.5–92 | | | Zoom ratio: 8 | |
| | F-number: 1.6 | | | Back focus length: Bf = 20.3 | |
| No. | Radius of curvature (r) | Axial thickness and distance of lens (d) | Refractive index (n) | Abbe's number | |
|---|---|---|---|---|---|
| (1) | 87.48300 | 1.30000 | 1.80499 | 25.32 | } $L_1$ } $G_1$ |
| (2) | 47.00000 | 10.30000 | 1.65102 | 58.55 | |
| (3) | −401.88400 | 0.10000 | | | |
| (4) | 49.60000 | 5.40000 | 1.51754 | 64.13 | $L_2$ |
| (5) | 128.86745 | $D_1$ (variable) | | | |
| (6) | 89.82700 | 1.00000 | 1.71341 | 53.92 | $L_3$ } $G_2$ |
| (7) | 15.40000 | 5.81978 | | | |
| (8) | −20.40000 | 1.00000 | 1.58920 | 61.18 | } $L_4$ |
| (9) | 18.00000 | 3.90000 | 1.71736 | 29.48 | |
| (10) | −295.34900 | $D_2$ (variable) | | | |
| (11) | −23.85400 | 1.00000 | 1.60427 | 60.55 | $L_5$–$G_3$ |
| (12) | −221.41758 | $D_3$ (variable) | | | |
| (13) | −156.35500 | 3.80000 | 1.71300 | 53.97 | $L_6$ |
| (14) | −28.38800 | 0.10000 | | | |
| (15) | 76.10100 | 7.30000 | 1.56384 | 60.82 | } $L_7$ } $G_{41}$ |
| (16) | −22.37000 | 1.00000 | 1.75692 | 31.70 | |
| (17) | −70.43700 | 0.10000 | | | |
| (18) | 30.52700 | 3.30000 | 1.71300 | 53.97 | $L_8$ } $G_4$ |
| (19) | 91.61450 | 20.45445 | | | |
| (20) | 80.91300 | 1.20000 | 1.80518 | 25.36 | $L_9$–$G_{2N}$ |
| (21) | 18.37800 | D = 4.20000 | | | |
| (22) | 29.72800 | 3.50000 | 1.51454 | 54.62 | $L_{10}$ } $G_{42}$ } $G_{2P}$ |
| (23) | −98.09700 | 0.10000 | | | |
| (24) | 30.18400 | 3.50000 | 1.51835 | 60.34 | $L_{11}$ |
| (25) | −87.09650 | | | | |

| f | 11.74 | 32.37 | 89.24 |
|---|---|---|---|
| $D_1$ | 0.88454 | 25.76287 | 39.84595 |
| $D_2$ | 41.96794 | 13.26234 | 3.25263 |
| $D_3$ | 4.95355 | 8.78083 | 4.70745 |

$f_{41} = 22.64 \quad \frac{f_{41}}{f_{42}} = 0.43 \quad \frac{D}{f_{42}} = 0.080$ $f_{42} = 52.61$ $f_N = -29.79 \quad \frac{f_N}{f_{42}} = 0.57 \quad \frac{r_b + r_a}{r_b - r_a} = -1.59$ $f_P = 22.75$

5. A zoom lens according to claim 3 comprising the following parameters:

| | Focal length: f = 10.5–105 | | | Zoom ratio: 10 | |
| | F-number: 1.6–1.8 | | | Back focus length: Bf = 20.9 | |
| No. | Radius of curvature (r) | Axial thickness and distance of lens (d) | Refractive index (n) | Abbe's number | |
|---|---|---|---|---|---|
| (1) | 114.03554 | 1.40000 | 1.80518 | 25.36 | } $L_1$ } $G_1$ |
| (2) | 54.14096 | 11.00000 | 1.60311 | 60.68 | |
| (3) | −279.33036 | 0.10000 | | | |
| (4) | 50.64850 | 6.90000 | 1.60311 | 60.68 | $L_2$ |
| (5) | 168.39185 | $D_1$ (variable) | | | |
| (6) | 111.32572 | 1.00000 | 1.71300 | 53.97 | $L_3$ } $G_2$ |
| (7) | 15.65706 | 6.30000 | | | |
| (8) | −20.70523 | 1.00000 | 1.60311 | 60.68 | } $L_4$ |
| (9) | 18.05059 | 4.60000 | 1.72825 | 28.34 | |
| (10) | 3166.44580 | $D_2$ (variable) | | | |
| (11) | −28.21079 | 1.00000 | 1.71300 | 53.97 | } $L_5$–$G_3$ |
| (12) | 40.95354 | 3.00000 | 1.75520 | 27.64 | |
| (13) | −364.36194 | $D_3$ (variable) | | | |
| (14) | −131.84266 | 3.80000 | 1.67790 | 55.61 | $L_6$ |
| (15) | −30.60149 | 0.10000 | | | |
| (16) | 89.01062 | 8.60000 | 1.56384 | 60.82 | } $L_7$ } $G_{41}$ |
| (17) | −21.83033 | 1.00000 | 1.75520 | 27.64 | |
| (18) | −89.13951 | 0.10000 | | | |
| (19) | 37.50940 | 5.00000 | 1.67790 | 55.61 | $L_8$ |

-continued

| No. | Radius of curvature (r) | Axial thickness and distance of lens (d) | Refractive index (n) | Abbe's number | | | |
|---|---|---|---|---|---|---|---|
| (20) | −545.69064 | 22.29852 | | | | | |
| (21) | 961.83658 | 1.00000 | 1.75692 | 31.70 | $L_9$ $G_{2N}$ | | $G_4$ |
| (22) | 27.18038 | D = 4.99746 | | | | | |
| (23) | 42.60442 | 3.60000 | 1.51454 | 54.62 | $L_{10}$ | $G_{42}$ | |
| (24) | −55.52480 | 0.10000 | | | | | |
| (25) | 31.98664 | 6.20000 | 1.50137 | 56.46 | $L_{11}$ | $G_{2P}$ | |
| (26) | −21.49719 | 1.00000 | 1.79668 | 45.52 | | | |
| (27) | −53.01002 | | | | | | |

| f | 10.71 | 33.03 | 101.85 |
|---|---|---|---|
| $D_1$ | 1.00224 | 28.21081 | 42.47571 |
| $D_2$ | 44.86062 | 12.83591 | 3.38776 |
| $D_3$ | 4.83770 | 9.65383 | 4.83709 |

$f_{41} = 25.03$    $\dfrac{f_{41}}{f_{42}} = 0.43$    $\dfrac{D}{f_{42}} = 0.086$
$f_{42} = 58.03$
$f_N = -36.97$    $\dfrac{f_N}{f_{42}} = 0.64$    $\dfrac{r_b + r_a}{r_b - r_a} = -1.06$
$f_P = 26.94$ 6. A zoom lens according to claim 3 comprising the following parameters:

Focal length: f = 9.5–123.5    Zoom ratio: 13
F-number: 1.6–2.0    Back focus length: Bf = 21.0

| No. | Radius of curvature (r) | Axial thickness and distance of lens (d) | Refractive index (n) | Abbe's number | | | | |
|---|---|---|---|---|---|---|---|---|
| (1) | 164.47510 | 2.40000 | 1.80518 | 25.36 | $L_1$ | | | |
| (2) | 57.57483 | 1.50000 | | | | $G_1$ | | |
| (3) | 59.81973 | 12.50000 | 1.62280 | 57.03 | $L_2$ | | | |
| (4) | −269.28461 | 0.20000 | | | | | | |
| (5) | 59.54058 | 7.00000 | 1.71300 | 53.97 | $L_3$ | | | |
| (6) | 270.98471 | $D_1$ (variable) | | | | | | |
| (7) | 56.62441 | 1.00000 | 1.79668 | 45.52 | $L_4$ | | | |
| (8) | 16.34713 | 7.10000 | | | | | | |
| (9) | −20.96462 | 1.00000 | 1.69350 | 53.76 | $L_5$ | $G_2$ | | |
| (10) | 18.03228 | 4.20000 | 1.80518 | 25.36 | | | | |
| (11) | 639.47905 | $D_2$ (variable) | | | | | | |
| (12) | −26.54970 | 1.00000 | 1.79668 | 45.52 | $L_6$–$G_3$ | | | |
| (13) | 54.33568 | 3.30000 | 1.80518 | 25.36 | | | | |
| (14) | −166.16348 | $D_3$ (variable) | | | | | | |
| (15) | −105.37465 | 6.00000 | 1.50137 | 56.46 | $L_7$ | | | |
| (16) | −24.83766 | 0.20000 | | | | | | |
| (17) | 226.03534 | 9.50000 | 1.49782 | 82.28 | $L_8$ | | $G_{41}$ | |
| (18) | −22.78339 | 1.00000 | 1.75692 | 31.70 | | | | |
| (19) | −70.94479 | 0.20000 | | | | | | $G_4$ |
| (20) | 107.58399 | 4.50000 | 1.50137 | 56.46 | $L_9$ | | | |
| (21) | −107.58399 | 0.20000 | | | | | | |
| (22) | 34.69279 | 6.50000 | 1.50137 | 56.46 | $L_{10}$ | | | |
| (23) | 340.16833 | 26.74563 | | | | | | |
| (24) | 124.33392 | 1.00000 | 1.79631 | 40.92 | $L_{11}$–$G_{2N}$ | | | |
| (25) | 19.23885 | D = 5.00000 | | | | | | |
| (26) | 20.78059 | 6.50000 | 1.51680 | 64.12 | $L_{12}$ | | $G_{42}$ | |
| (27) | −33.91813 | 0.20000 | | | | | | |
| (28) | 59.95957 | 6.50000 | 1.50137 | 56.46 | $L_{13}$ | $G_{2P}$ | | |
| (29) | −16.59106 | 1.00000 | 1.79631 | 40.92 | | | | |
| (30) | −83.63835 | | | | | | | |

| f | 9.70 | 34.26 | 121.01 |
|---|---|---|---|
| $D_1$ | 0.99038 | 32.62359 | 48.04898 |
| $D_2$ | 50.92201 | 14.34962 | 3.86358 |
| $D_3$ | 5.27426 | 10.21343 | 5.27409 |

$f_{41} = 27.53$    $\dfrac{f_{41}}{f_{42}} = 0.37$    $\dfrac{D}{f_{42}} = 0.067$
$f_{42} = 74.64$
$f_N = -28.70$    $\dfrac{f_N}{f_{42}} = 0.38$    $\dfrac{r_b + r_a}{r_b - r_a} = -1.37$
$f_P = 24.98$ 7. A zoom lens according to claim 3 comprising the following parameters:

Focal length: f = 9.5–123.5    Zoom ratio: 13
F-number: 1.6–2.2    Back focus length: Bf = 22.9

-continued

| No. | Radius of curvature (r) | Axial thickness and distance of lens (d) | Refractive index (n) | Abbe's number | | |
|---|---|---|---|---|---|---|
| (1) | 1502.13023 | 2.30000 | 1.80518 | 25.36 | $L_1$ | |
| (2) | 90.78012 | 5.80000 | | | | |
| (3) | 1926.73228 | 4.30000 | 1.49782 | 82.28 | $L_2$ | $G_1$ |
| (4) | −183.73229 | 0.20000 | | | | |
| (5) | 109.90946 | 7.60000 | 1.60311 | 60.68 | $L_3$ | |
| (6) | −255.50723 | 0.20000 | | | | |
| (7) | 58.97339 | 9.00000 | 1.60311 | 60.68 | $L_4$ | |
| (8) | 888.25417 | $D_1$ (variable) | | | | |
| (9) | 52.54722 | 1.00000 | 1.77279 | 49.44 | $L_5$ | |
| (10) | 16.69305 | 4.40000 | | | | |
| (11) | −94.40983 | 1.30000 | 1.77279 | 49.44 | $L_6$ | $G_2$ |
| (12) | 270.28738 | 3.30000 | | | | |
| (13) | −18.84218 | 1.00000 | 1.71300 | 53.97 | $L_7$ | |
| (14) | 29.89061 | 3.70000 | 1.80518 | 25.36 | | |
| (15) | −54.55838 | $D_2$ (variable) | | | | |
| (16) | −27.12786 | 1.00000 | 1.77279 | 49.44 | $L_8$ | $G_3$ |
| (17) | 48.81202 | 3.50000 | 1.78470 | 26.07 | | |
| (18) | −182.34763 | $D_3$ (variable) | | | | |
| (19) | −84.05917 | 4.40000 | 1.51680 | 64.12 | $L_9$ | |
| (20) | −28.13976 | 0.20000 | | | | |
| (21) | 191.32051 | 11.00000 | 1.49782 | 82.28 | $L_{10}$ | $G_{41}$ |
| (22) | −23.89707 | 1.00000 | 1.74950 | 35.19 | | |
| (23) | −60.76258 | 0.20000 | | | | |
| (24) | 94.96796 | 5.50000 | 1.48749 | 70.24 | $L_{11}$ | |
| (25) | −80.33178 | 0.20000 | | | | $G_4$ |
| (26) | 36.35731 | 6.50000 | 1.48749 | 70.24 | $L_{12}$ | |
| (27) | 647.60464 | 25.45640 | | | | |
| (28) | −4355.69598 | 1.20000 | 1.75692 | 31.70 | $L_{13}$–$G_{2N}$ | |
| (29) | 20.13725 | D = 5.01602 | | | | |
| (30) | 23.41871 | 6.00000 | 1.50137 | 56.46 | $L_{14}$ | $G_{42}$ |
| (31) | −39.05657 | 0.20000 | | | | |
| (32) | 44.06630 | 5.80000 | 1.50137 | 56.46 | $L_{15}$ $G_{2P}$ | |
| (33) | −20.99092 | 1.00000 | 1.79631 | 40.98 | | |
| (34) | −92.42991 | | | | | |

| f | 9.5 | 34 | 123.5 |
|---|---|---|---|
| $D_1$ | 0.77634 | 34.38666 | 50.62356 |
| $D_2$ | 52.58988 | 13.78311 | 2.74391 |
| $D_3$ | 4.01614 | 9.21258 | 4.01488 |

$f_{41} = 27.21$   $\dfrac{f_{41}}{f_{42}} = 0.31$   $\dfrac{D}{f_{42}} = 0.057$ $f_{42} = 88.31$ $f_N = -26.48$   $\dfrac{f_N}{f_{42}} = 0.30$   $\dfrac{r_b + r_a}{r_b - r_a} = -0.99$ $f_P = 25.45$ 8. A telecentric zoom lens having a long back-focus length and capable of very close range photography over the entire zooming range, comprising in the order from the object side:

a focusing lens unit of positive refractive power axially movable for zooming;

a variator lens unit of negative refractive power axially movable for zooming;

a compensator lens unit of negative refractive power axially movable for zooming; and a relay lens unit comprising a front lens group of positive refractive power and a rear lens group of positive refractive power including a negative lens component and a positive lens component positioned axially movably behind said negative lens component, light beams at the object side of said negative lens component being convergent and light beams at the image side of said negative lens component being approximately parallel, said positive lens component of said rear lens group being movable independently of said focusing lens unit in order to attain focusing onto an object positioned closer than the focusing range of said focusing lens unit, and said variator lens unit and said compensator lens unit being movable only for zooming and being maintained at a certain zooming position for focusing attained by said positive lens component in said rear lens group, wherein said zoom lens satisfies the following relations:

$0.5 < f_{42}/f_T < 0.75$ $0.16 < D/f_p < 0.4$ where $f_T$ stands for the focal length of the entire lens system at the telescopic end of the zooming range, $f_{42}$ stands for the focal length of the rear relay lens group, D stands for the distance between the negative lens component and the positive lens component of the rear relay lens group, $f_p$ stands for the focal length of the positive lens component, and wherein said negative lens component of said rear lens group satisfies the following relation:

$-2.0 < (r_b + r_a)/(r_b - r_a) < -0.9$ where $r_a$ and $r_b$ respectively stand for radii of curvature at the object side and at the image side of the negative lens component in said rear lens group.

9. A telecentric zoom lens according to claim 8, wherein said positive lens component of said rear lens group includes two positive lens elements.

10. A telecentric zoom lens according to claim 9, further satisfying the following condition:

$$0.7 < f_p/B < 1.3$$

where B stands for the distance from the rear principal point of said positive lens component to the image plane of said telecentric zoom lens.

11. A zoom lens according to claim 10, comprising following parameters:

Focal length: f = 9.65–123.5  Zoom ratio: 12.8
F-number: 1.6–2.2  Back focus length: Bf = 22.93

| No. | Radius of curvature (r) | Axial thickness and distance of lens (d) | Refractive index (n) | Abbe's number | | | |
|---|---|---|---|---|---|---|---|
| (1) | 1502.13023 | 2.30000 | 1.80518 | 25.36 | $L_1$ | | |
| (2) | 90.78012 | 5.80000 | | | | | |
| (3) | 1926.73228 | 4.30000 | 1.49782 | 82.28 | $L_2$ | $G_1$ | |
| (4) | −183.73229 | 0.20000 | | | | | |
| (5) | 109.90946 | 7.60000 | 1.60311 | 60.68 | $L_3$ | | |
| (6) | −255.50723 | 0.20000 | | | | | |
| (7) | 58.97339 | 9.00000 | 1.60311 | 60.68 | $L_4$ | | |
| (8) | 888.25394 | $D_1$ (variable) | | | | | |
| (9) | 52.54722 | 1.00000 | 1.77279 | 49.44 | $L_5$ | | |
| (10) | 16.69305 | 4.40000 | | | | | |
| (11) | −94.40983 | 1.30000 | 1.77279 | 49.44 | $L_6$ | $G_2$ | |
| (12) | 270.28738 | 3.30000 | | | | | |
| (13) | −18.84218 | 1.00000 | 1.71300 | 53.97 | $L_7$ | | |
| (14) | 29.89061 | 3.70000 | 1.80518 | 25.36 | | | |
| (15) | −54.55838 | $D_2$ (variable) | | | | | |
| (16) | −27.12786 | 1.00000 | 1.77279 | 49.44 | $L_8$ | $G_3$ | |
| (17) | 48.81202 | 3.50000 | 1.78470 | 26.07 | | | |
| (18) | −182.34762 | $D_3$ (variable) | | | | | |
| (19) | −84.05917 | 4.40000 | 1.51680 | 64.12 | $L_9$ | | |
| (20) | −28.13976 | 0.20000 | | | | | |
| (21) | 191.32051 | 11.00000 | 1.49782 | 82.28 | $L_{10}$ | $G_{41}$ | |
| (22) | −23.89707 | 1.00000 | 1.74950 | 35.19 | | | |
| (23) | −60.76258 | 0.20000 | | | | | |
| (24) | 94.96796 | 5.50000 | 1.48749 | 70.24 | $L_{11}$ | | $G_4$ |
| (25) | −80.33178 | 0.20000 | | | | | |
| (26) | 36.35731 | 6.50000 | 1.48749 | 70.24 | $L_{12}$ | | |
| (27) | 647.60422 | D = 25.45640 | | | | | |
| (28) | −4355.69598 | 1.20000 | 1.75692 | 31.70 | $L_{13}$ | $G_N$ | |
| (29) | 20.13725 | 5.01602 | | | | | |
| (30) | 23.41871 | 6.00000 | 1.50137 | 56.46 | $L_{14}$ | $G_P$ | $G_{42}$ |
| (31) | −39.05657 | 0.20000 | | | | | |
| (32) | 44.06630 | 5.80000 | 1.50137 | 56.46 | $L_{15}$ | | |
| (33) | −20.99092 | 1.00000 | 1.79631 | 40.92 | | | |
| (34) | −92.42991 | | | | | | |

12. A zoom lens according to claim 10, comprising following parameters:

Focal length: f = 11.74–89.24  Zoom ratio: 7.6
F-number: 1.6  Back focus length: Bf = 20.32

| No. | Radius of curvature (r) | Axial thickness and distance of lens (d) | Refractive index (n) | Abbe's number | | | |
|---|---|---|---|---|---|---|---|
| (1) | 87.48300 | 1.30000 | 1.80518 | 25.36 | $L_1$ | $G_1$ | |
| (2) | 47.00000 | 10.30000 | 1.65160 | 58.54 | | | |
| (3) | −401.88400 | 0.10000 | | | | | |
| (4) | 49.60000 | 5.40000 | 1.51680 | 64.12 | $L_2$ | | |
| (5) | 128.78410 | $D_1$ (variable) | | | | | |
| (6) | 89.82700 | 1.00000 | 1.71300 | 53.97 | $L_3$ | | |
| (7) | 15.40000 | 5.81978 | | | | | |
| (8) | −20.40000 | 1.00000 | 1.58913 | 61.18 | $L_4$ | $G_2$ | |
| (9) | 18.00000 | 3.90000 | 1.71736 | 29.48 | | | |
| (10) | −298.22686 | $D_2$ (variable) | | | | | |
| (11) | −23.85400 | 1.00000 | 1.60311 | 60.68 | $L_5$ | $G_3$ | |
| (12) | −224.93405 | $D_3$ (variable) | | | | | |
| (13) | −156.35500 | 3.80000 | 1.71300 | 53.97 | $L_6$ | | |
| (14) | −28.38800 | 0.10000 | | | | | |
| (15) | 76.10100 | 7.30000 | 1.56384 | 60.82 | $L_7$ | $G_{41}$ | |
| (16) | −22.37000 | 1.00000 | 1.75692 | 31.70 | | | |

-continued

| | | | | | | | |
|---|---|---|---|---|---|---|---|
| (17) | −70.43700 | 0.10000 | | | | | |
| (18) | 30.52700 | 3.30000 | 1.71300 | 53.97 | $L_8$ | | |
| (19) | 91.61446 | 20.45445 | | | | | $G_4$ |
| (20) | 80.91300 | 1.20000 | 1.80518 | 25.36 | $L_9$ | $G_N$ | |
| (21) | 18.37800 | D = 4.20000 | | | | | $G_{42}$ |
| (22) | 29.72800 | 3.50000 | 1.51454 | 54.62 | $L_{10}$ | $G_P$ | |
| (23) | −98.09700 | 0.10000 | | | | | |
| (24) | 30.18400 | 3.5000 | 1.51835 | 60.34 | $L_{11}$ | | |
| (25) | −87.09650 | | | | | | |